US011760275B2

(12) United States Patent
Iida et al.

(10) Patent No.: US 11,760,275 B2
(45) Date of Patent: Sep. 19, 2023

(54) IMAGE PICKUP SYSTEM AND IMAGE PICKUP DEVICE

(71) Applicant: TOYOTA JIDOSHA KABUSHIKI KAISHA, Toyota (JP)

(72) Inventors: Tomoaki Iida, Okazaki (JP); Sho Horiuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 17/526,216

(22) Filed: Nov. 15, 2021

(65) Prior Publication Data
US 2022/0171275 A1 Jun. 2, 2022

(30) Foreign Application Priority Data

Nov. 30, 2020 (JP) .................................. 2020-198575

(51) Int. Cl.
| | | |
|---|---|---|
| *B60R 11/04* | (2006.01) | |
| *B60R 1/24* | (2022.01) | |
| *G03B 30/00* | (2021.01) | |
| *G02B 13/06* | (2006.01) | |
| *G02B 7/02* | (2021.01) | |
| *B60R 1/00* | (2022.01) | |

(52) U.S. Cl.
CPC ................ *B60R 11/04* (2013.01); *B60R 1/00* (2013.01); *B60R 1/24* (2022.01); *G02B 7/02* (2013.01); *G02B 13/06* (2013.01); *G03B 30/00* (2021.01); *B60R 2300/607* (2013.01)

(58) Field of Classification Search
CPC ..... B60R 1/24; B60R 11/04; B60R 2300/101; B60R 2300/102; B60R 2300/108; B60R 2300/60; B60R 2300/607; B60R 2300/802; H04N 23/90; H04N 23/698
USPC .................................................... 348/207.99
See application file for complete search history.

(56) References Cited

U.S. PATENT DOCUMENTS 7,365,779 B2 * 4/2008 Yamada ................... G01C 3/00
348/148
10,447,948 B2 * 10/2019 Aihara ................... H04N 23/80
(Continued)

FOREIGN PATENT DOCUMENTS

DE 10253378 A1 6/2003
DE 102006024187 A1 * 11/2006 ............. B60R 11/04
(Continued)

*Primary Examiner* — Anthony J Daniels
(74) *Attorney, Agent, or Firm* — Sughrue Mion, PLLC

(57) ABSTRACT

Provided is an image pickup system including: a front camera sensor; and a camera sensor for image generation having a second horizontal angle of view. The latter camera sensor includes: an image sensor having an image pickup surface; and an optical system having a lens. The image sensor has: a specific region in which light from an object positioned within a diagonal lateral azimuth angle range is to be imaged onto the image pickup surface; and a residual region in which light from an object positioned within a residual azimuth angle range is to be imaged onto the image pickup surface, the residual azimuth angle range being obtained by excluding the diagonal lateral azimuth angle range from the second horizontal angle of view. The lens has a curved surface formed so that a horizontal pixel density in the specific region becomes larger than that in the residual region.

16 Claims, 12 Drawing Sheets

(56) References Cited

U.S. PATENT DOCUMENTS

| | | | |
|---|---|---|---|
| 10,489,666 B2 * | 11/2019 | Aihara | A61B 5/18 |
| 10,623,618 B2 * | 4/2020 | Aihara | H04N 23/63 |
| 10,800,330 B2 * | 10/2020 | Chae | H04N 23/58 |
| 10,882,465 B2 * | 1/2021 | Lee | B60R 21/0134 |
| 10,917,610 B2 * | 2/2021 | Aihara | H04N 7/18 |
| 11,159,744 B2 * | 10/2021 | Aihara | G02B 3/02 |
| 11,310,461 B2 * | 4/2022 | Aihara | G02B 13/18 |
| 2003/0095182 A1 | 5/2003 | Imoto | |
| 2015/0332101 A1 * | 11/2015 | Takaki | B60T 7/22 |
| | | | 382/104 |
| 2016/0148062 A1 * | 5/2016 | Fürsich | G06V 20/56 |
| | | | 348/36 |
| 2017/0057498 A1 | 3/2017 | Katoh | |
| 2018/0160052 A1 * | 6/2018 | Aihara | G02B 13/18 |
| 2018/0332243 A1 * | 11/2018 | Aihara | B60R 1/00 |
| 2018/0338095 A1 * | 11/2018 | Aihara | H04N 23/55 |
| 2019/0061621 A1 * | 2/2019 | Chae | H04N 23/62 |
| 2019/0124273 A1 * | 4/2019 | Liebetraut | H04N 23/60 |
| 2019/0188504 A1 * | 6/2019 | Aihara | H04N 23/54 |
| 2019/0191064 A1 * | 6/2019 | Aihara | B60R 1/00 |
| 2019/0273889 A1 * | 9/2019 | Aihara | B60R 1/00 |
| 2019/0279006 A1 * | 9/2019 | Ozawa | G01S 13/931 |
| 2020/0324713 A1 * | 10/2020 | Lee | B60R 11/04 |
| 2020/0404187 A1 * | 12/2020 | Iida | H04N 23/90 |
| 2021/0127086 A1 * | 4/2021 | Aihara | H04N 23/54 |
| 2022/0250542 A1 * | 8/2022 | Horiuchi | B60W 50/14 |

FOREIGN PATENT DOCUMENTS

| | | | | |
|---|---|---|---|---|
| JP | 2017-043262 A | | 3/2017 | |
| JP | 2018-195951 A | | 12/2018 | |
| JP | 2019-110517 A | | 7/2019 | |
| WO | WO-2017187811 A1 * | | 11/2017 | B60R 1/00 |

* cited by examiner

IMAGE PICKUP SYSTEM AND IMAGE PICKUP DEVICE

BACKGROUND OF THE INVENTION

1. Field of the Invention

The present invention relates to an image pickup system and an image pickup device which are capable of picking up an image of a three-dimensional object present diagonally in front of a vehicle.

2. Description of the Related Art

Hitherto, there has been known a technology of executing control (collision avoidance control) involving detection of a three-dimensional object present in front of a vehicle to avoid collision of the vehicle with the three-dimensional object or reduce an impact to be caused by the collision (see, for example, Japanese Patent Application Laid-open No. 2017-043262).

The detection of the three-dimensional object is performed by picking up an image of a front side of the vehicle through use of an image pickup device and analyzing image data obtained through the image pickup. An optical axis of the image pickup device is parallel to a longitudinal axis of the vehicle (axis that is a perpendicular bisector of a width of the vehicle and is also parallel to a tread), and a horizontal angle of view of the image pickup device is, for example, 100 degrees.

SUMMARY OF THE INVENTION

According to the technology of the related art, the horizontal angle of view of the image pickup device is, for example, 100 degrees, and hence it is difficult to appropriately execute the collision avoidance control with respect to a three-dimensional object positioned in a region outside of this angle of view (region from a diagonally front side of the vehicle to a direction close to a vehicle lateral side).

In consideration of the above, for example, the image pickup device may be configured to have a horizontal angle of view wider than that in the related art (for example, 180 degrees). However, when the horizontal angle of view is widened while the number of pixels of the image pickup device (strictly speaking, the number of pixels of an image sensor included in the image pickup device) is maintained, the number of pixels per unit horizontal angle of view is reduced. As a result, a resolution of an image (ability to detect a three-dimensional object by analyzing the image data) is reduced, and hence a limit value of a detectable distance for the three-dimensional object (detection limit distance) is shortened.

Therefore, it is conceivable to adopt an image pickup device in which the horizontal angle of view is widened and also the number of pixels of the image sensor is increased. However, when the number of pixels of the image sensor is greatly increased, there arise problems of causing a great increase of cost of the image pickup device, an increase in size of the image pickup device, and increases of a power consumption amount and a heat generation amount.

The present invention has been made to solve the above-mentioned problems. That is, the present invention has one object to provide an image pickup system and an image pickup device which are capable of appropriately picking up an image of a three-dimensional object present diagonally in front of a vehicle, without greatly increasing the number of pixels of an image sensor.

According to at least one embodiment of the present invention, there is provided an image pickup system for a vehicle (hereinafter also referred to as "first invention system"), the image pickup system including: a front camera sensor (30) having a predetermined first horizontal angle of view (100 degrees) in which a horizontal angle of view is less than 180 degrees when an orientation of a reference axis (A) that is an axis parallel to a longitudinal axis of a vehicle (V) is set as a reference orientation, the front camera sensor (30) being configured to be mounted to the vehicle (V) so that the first horizontal angle of view (100 degrees) is included in a region on a front side of the vehicle (V) with respect to azimuth angles (90 degrees, −90 degrees) corresponding to a lateral direction of the vehicle (V), the front camera sensor (30) further being configured to perform photoelectric conversion on light from, among objects positioned in front of the vehicle (V), an object positioned within the first horizontal angle of view (100 degrees) into an electrical signal, to thereby acquire front narrow-area image data to be used for driving support control of the vehicle (V); and a camera sensor for image generation (20F, 120L, 120R) having a predetermined second horizontal angle of view (180 degrees) in which the horizontal angle of view is 180 degrees or more, the camera sensor for image generation (20F, 120L, 120R) being configured to be mounted to the vehicle (V), and further being configured to perform photoelectric conversion on light from, among objects positioned around the vehicle (V), an object positioned within the second horizontal angle of view (180 degrees) into an electrical signal, to thereby acquire surrounding wide-area image data to be used for generating an overhead view image of the vehicle (V), wherein the camera sensor for image generation (20F, 120L, 120R) includes: an image sensor (22, 122L, 122R) having an image pickup surface (22a, 122aL, 122aR) in which a plurality of pixels each configured to perform the photoelectric conversion are two-dimensionally arrayed; and an optical system (21, 121L, 121R), which includes a lens (21a, 121aL, 121aR), and is configured to image the light from the objects onto the image pickup surface, wherein the image sensor (22, 122L, 122R) has: a specific region (S1, S3, S5) in which light from an object positioned within a diagonal lateral azimuth angle range (first range, third range, fifth range) is to be imaged onto the image pickup surface, the diagonal lateral azimuth angle range being a range from a predetermined azimuth angle (52 degrees, −52 degrees) to an azimuth angle (80 degrees, −80 degrees) corresponding to a diagonally forward direction of the vehicle (V), the predetermined azimuth angle being determined based on a boundary azimuth angle (50 degrees, −50 degrees) being an azimuth angle at a boundary line defining the first horizontal angle of view (100 degrees); and a residual region (S2, S4, S6) in which light from an object positioned within a residual azimuth angle range (second range, fourth range, sixth range) is to be imaged onto the image pickup surface, the residual azimuth angle range being obtained by excluding the diagonal lateral azimuth angle range from the second horizontal angle of view (180 degrees), wherein the lens (21a, 121aL, 121aR) is a lens having a curved surface formed so that a horizontal pixel density in the specific region (S1, S3, S5) becomes larger than the horizontal pixel density in the residual region (S2, S4, S6), the horizontal pixel density being the number of pixels per unit horizontal angle of view, and wherein the surrounding wide-area image data acquired by the camera sensor for image generation (20F, 120L, 120R) is formed to be usable for the driving support control of the vehicle.

According to the first invention system, a resolution in the specific region is higher than a resolution in the residual region, and hence a detection limit distance for the three-dimensional object in the diagonal lateral azimuth angle range is longer than the detection limit distance for the three-dimensional object in the residual azimuth angle range. Here, the diagonal lateral azimuth angle range is a range corresponding to a diagonally front side of the vehicle. Accordingly, the first invention system can pick up an image of a three-dimensional object present diagonally in front of the vehicle over a relatively long distance.

In addition, the horizontal pixel density in the residual region is smaller than the horizontal pixel density in the specific region, and hence, as compared to a configuration in which the horizontal pixel density in the residual region is set to be equivalent to the horizontal pixel density in the specific region, a great increase of the number of pixels of the image sensor can be suppressed.

Therefore, according to the configuration of the first invention system, the image of the three-dimensional object present diagonally in front of the vehicle can be appropriately picked up without greatly increasing the number of pixels of the image sensor.

In particular, according to the first invention system, the lens having the above-mentioned curved surface is applied to the camera sensor for image generation, thereby being capable of picking up an image of a three-dimensional object present diagonally in front of the vehicle over a relatively long distance. Here, the camera sensor for image generation is a camera sensor that has been provided on the vehicle in the related art. Accordingly, a camera sensor configured to pick up an image of the diagonally front side is not required to be newly introduced, and the first invention system can be achieved with relatively low cost.

In addition, according to the first invention system, the surrounding wide-area image data is formed to be usable for the driving support control. Accordingly, the driving support control may be appropriately executed even with respect to a three-dimensional object positioned in a region for which it has been difficult to appropriately execute the driving support control (for example, collision avoidance control) in the related art (typically, a region diagonally in front of the vehicle).

According to at least one embodiment of the present invention, there is provided an image pickup device (hereinafter also referred to as "second invention device") which is mountable to a front part (P1) of a vehicle (V), the image pickup device including: an image sensor (22) having an image pickup surface (22a) in which a plurality of pixels are two-dimensionally arrayed, the plurality of pixels each being configured to perform photoelectric conversion on received light into an electrical signal and output the electrical signal; and an optical system (21), which includes a lens (21a), and is configured to image light from an object onto the image pickup surface (22a), wherein dimensions of the image pickup surface (22a) and a focal length of the lens (21a) are set so that a horizontal angle of view is 180 degrees or more.

When an orientation of a reference axis (A) that is an axis passing through a mounting position (P1) to the vehicle (V) and being parallel to a longitudinal axis of the vehicle (V) is set as a reference orientation, in a case in which, in the horizontal angle of view, an azimuth angle ($\theta f$) on a left side of the reference axis (A) is defined to have a positive value, and an azimuth angle ($\theta f$) on a right side of the reference axis (A) is defined to have a negative value: the reference axis (A) is included in a vertical angle of view; and the image pickup surface (22a) has: a first region (S1) which is a region corresponding to a left first range ($52° \leq \theta f \leq 80°$) and a right first range ($-80° \leq \theta f \leq -52°$), the left first range being included in an azimuth angle range that is larger than 45 degrees and smaller than 90 degrees, the right first range being included in an azimuth angle range that is larger than −90 degrees and smaller than −45 degrees; and a second region (S2) which is a region corresponding to a second range ($0° \leq \theta f \leq 52°$, $80° < \theta f \leq 90°$, $-90° \leq \theta f < -80°$, and $-52° < \theta f \leq 0°$) being an azimuth angle range of the horizontal angle of view excluding the left first range and the right first range, and wherein the lens (21a) has a curved surface formed so that a horizontal pixel density in the first region (S1) becomes larger than the horizontal pixel density in the second region (S2), the horizontal pixel density being the number of pixels per unit horizontal angle of view.

According to the second invention device, the resolution in the first region is higher than the resolution in the second region, and hence the detection limit distances for the three-dimensional object in the left first range and the right first range are longer than the detection limit distance for the three-dimensional object in the second range. Here, the left first range is a range included in an azimuth angle range that is larger than 45 degrees and smaller than 90 degrees, and the right first range is a range included in an azimuth angle range that is larger than −90 degrees and smaller than −45 degrees. That is, the left first range is a range corresponding to the diagonally forward left of the vehicle, and the right first range is a range corresponding to the diagonally forward right of the vehicle. Accordingly, the second invention device can pick up an image of a "three-dimensional object present diagonally in front of the vehicle" over a longer distance relative to "three-dimensional objects present in front and on a lateral side of a front part of the vehicle."

In addition, the horizontal pixel density in the second region is smaller than the horizontal pixel density in the first region, and hence, as compared to a configuration in which the horizontal pixel density in the second region is set to be equivalent to the horizontal pixel density in the first region, a great increase of the number of pixels of the image sensor can be suppressed.

Therefore, according to the configuration of the second invention device, the image of the three-dimensional object present diagonally in front of the vehicle can be appropriately picked up without greatly increasing the number of pixels of the image sensor.

The three-dimensional object may be detected by the image pickup device, or may be detected by an image processing device that may be connected to the image pickup device.

According to one aspect of the present invention, the second invention device (20F) is configured to acquire surrounding wide-area image data to be used for generating an overhead view image of the vehicle (V).

According to this configuration, the second invention device also functions as an image pickup device to be used for generation of the overhead view image.

Accordingly, it is only required to partially change the specification (for example, change the lens to the lens in the second invention device) of the image pickup device for generating the overhead view image, which has been mounted on the front part of the vehicle in the related art, and it is not required to newly introduce an image pickup device.

Therefore, the second invention device can be achieved with relatively low cost.

According to at least one embodiment of the present invention, there is provided an image pickup device (hereinafter also referred to as "third invention device") which is mountable to a left lateral part (P2) of a vehicle (V), the image pickup device including: an image sensor (122L) having an image pickup surface (122aL) in which a plurality of pixels are two-dimensionally arrayed, the plurality of pixels each being configured to perform photoelectric conversion on received light into an electrical signal and output the electrical signal; and an optical system (121L), which includes a lens (121aL), and is configured to image light from an object onto the image pickup surface (122aL), wherein dimensions of the image pickup surface (122aL) and a focal length of the lens (121aL) are set so that a horizontal angle of view is 180 degrees or more.

When an orientation of a reference axis (A1) that is an axis passing through a mounting position (P2) to the vehicle (V) and being parallel to a longitudinal axis of the vehicle (V) is set as a reference orientation, in a case in which, in the horizontal angle of view, an azimuth angle (θl) on a left side of the reference axis (A1) is defined to have a positive value, and an azimuth angle (θl) on a right side of the reference axis (A1) is defined to have a negative value: the reference axis (A1) is included in a vertical angle of view; and the image pickup surface (122aL) has: a third region (S3) which is a region corresponding to a third range ($52° \leq \theta l \leq 80°$) and a fourth region (S4) which is a region corresponding to a fourth range ($0° \leq \theta l < 52°$, $80° < \theta l \leq 90°$), the third range being included in an azimuth angle range that is larger than 45 degrees and smaller than 90 degrees, the fourth range being an azimuth angle range of the horizontal angle of view excluding the third range, and wherein the lens (121aL) has a curved surface formed so that a horizontal pixel density in the third region (S3) becomes larger than the horizontal pixel density in the fourth region (S4), the horizontal pixel density being the number of pixels per unit horizontal angle of view.

According to the third invention device, the detection limit distance for the three-dimensional object in the third range is longer than the detection limit distance for the three-dimensional object in the fourth range. Here, the third range is a range included in an azimuth angle range that is larger than 45 degrees and smaller than 90 degrees, and hence is a range corresponding to the diagonally forward left of the vehicle. Accordingly, the second invention device can pick up an image of a "three-dimensional object present diagonally forward left of the vehicle" over a longer distance relative to "three-dimensional objects present in front of the vehicle."

In addition, the horizontal pixel density in the fourth region is smaller than the horizontal pixel density in the third region, and hence, as compared to a configuration in which the horizontal pixel density in the fourth region is set to be equivalent to the horizontal pixel density in the third region, a great increase of the number of pixels of the image sensor can be suppressed.

Therefore, according to the configuration of the third invention device, the image of the three-dimensional object present diagonally forward left of the vehicle can be appropriately picked up without greatly increasing the number of pixels of the image sensor.

According to one aspect of the present invention, the third invention device (120L) is configured to acquire surrounding wide-area image data to be used for generating an overhead view image of the vehicle (V).

According to this configuration, the third invention device also functions as an image pickup device to be used for generation of the overhead view image. Accordingly, it is only required to partially change the specification (for example, change the lens to the lens in the third invention device) of the image pickup device for generating the overhead view image, which has been mounted on the left lateral part of the vehicle in the related art, and it is not required to newly introduce an image pickup device. Therefore, the third invention device can be achieved with relatively low cost.

According to at least one embodiment of the present invention, there is provided an image pickup device (hereinafter also referred to as "fourth invention device") which is mountable to a right lateral part (P3) of a vehicle (V), the image pickup device including: an image sensor (122R) having an image pickup surface (122aR) in which a plurality of pixels are two-dimensionally arrayed, the plurality of pixels each being configured to perform photoelectric conversion on received light into an electrical signal and output the electrical signal; and an optical system (121R), which includes a lens (121aR), and is configured to image light from an object onto the image pickup surface (122aR), wherein dimensions of the image pickup surface (122aR) and a focal length of the lens (121aR) are set so that a horizontal angle of view is 180 degrees or more.

When an orientation of a reference axis (A2) that is an axis passing through a mounting position (P3) to the vehicle (V) and being parallel to a longitudinal axis of the vehicle (V) is set as a reference orientation, in a case in which, in the horizontal angle of view, an azimuth angle (θr) on a right side of the reference axis (A2) is defined to have a positive value, and an azimuth angle (θr) on a left side of the reference axis (A2) is defined to have a negative value: the reference axis (A2) is included in a vertical angle of view; and the image pickup surface (122aR) has: a fifth region (S5) which is a region corresponding to a fifth range ($52° \leq \theta r \leq 80°$) and a sixth region (S6) which is a region corresponding to a sixth range ($0° \leq \theta r < 52°$, $80° < \theta r \leq 90°$), the fifth range being included in an azimuth angle range that is larger than 45 degrees and smaller than 90 degrees, the sixth range being an azimuth angle range of the horizontal angle of view excluding the fifth range, and wherein the lens (121aR) has a curved surface formed so that a horizontal pixel density in the fifth region (S5) becomes larger than the horizontal pixel density in the a sixth region (S6), the horizontal pixel density being the number of pixels per unit horizontal angle of view.

According to the fourth invention device, the detection limit distance for the three-dimensional object in the fifth range is longer than the detection limit distance for the three-dimensional object in the sixth range. Here, the fifth range is a range included in an azimuth angle range that is larger than 45 degrees and smaller than 90 degrees, and hence is a range corresponding to the diagonally forward right of the vehicle. Accordingly, the third invention device can pick up an image of a "three-dimensional object present diagonally forward right of the vehicle" over a longer distance relative to "three-dimensional objects present in front of the vehicle."

In addition, the horizontal pixel density in the sixth region is smaller than the horizontal pixel density in the fifth region, and hence, as compared to a configuration in which the horizontal pixel density in the sixth region is set to be equivalent to the horizontal pixel density in the fifth region, a great increase of the number of pixels of the image sensor can be suppressed.

Therefore, according to the configuration of the fourth invention device, the image of the three-dimensional object present diagonally forward right of the vehicle can be appropriately picked up without greatly increasing the number of pixels of the image sensor.

According to one aspect of the present invention, the fourth invention device (120R) is configured to acquire surrounding wide-area image data to be used for generating an overhead view image of the vehicle (V).

According to this configuration, the fourth invention device also functions as an image pickup device to be used for generation of the overhead view image.

Accordingly, it is only required to partially change the specification (for example, change the lens to the lens in the fourth invention device) of the image pickup device for generating the overhead view image, which has been mounted on the right lateral part of the vehicle in the related art, and it is not required to newly introduce an image pickup device.

Therefore, the fourth invention device can be achieved with relatively low cost.

In the description above, in order to facilitate understanding of the invention, reference symbols used in an embodiment of the present invention are enclosed in parentheses, and are assigned to each of constituent features of the invention corresponding to the embodiment. However, each of the constituent features of the invention is not limited to the embodiment prescribed by the reference symbols.

DESCRIPTION OF THE EMBODIMENTS

First Embodiment

Now, a driving support apparatus including a front panoramic view monitor (PVM) camera sensor serving as an image pickup device according to a first embodiment of the present invention is described with reference to the drawings. The driving support apparatus is applied to a vehicle. In the following, this vehicle is sometimes referred to as "own vehicle" for distinction from other vehicles.

Figure 1:
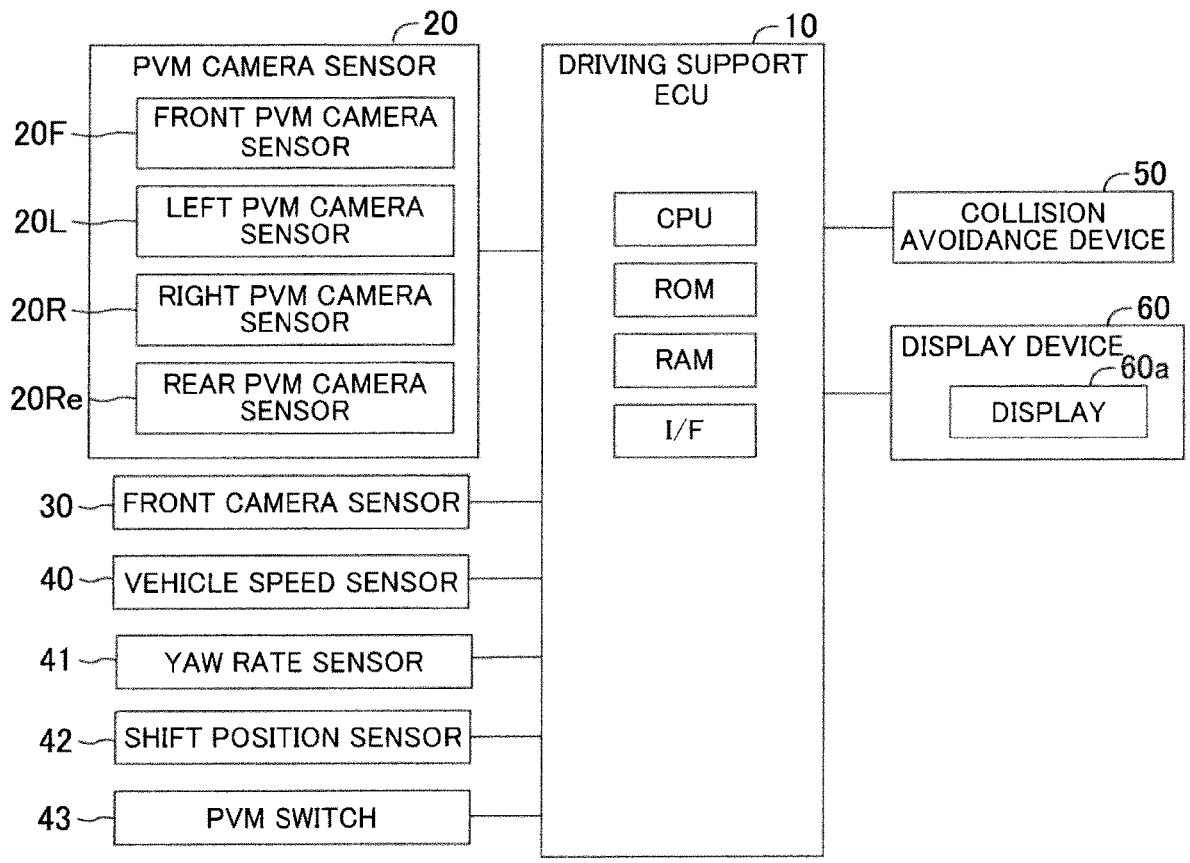
FIG. 1 is a schematic configuration diagram of a driving support apparatus including a front PVM camera sensor according to a first embodiment of the present invention.

As illustrated in FIG. 1, the driving support apparatus includes a driving support ECU 10 (hereinafter simply referred to as "ECU 10"). ECU stands for "electronic control unit," and includes a microcomputer as a main unit. The microcomputer includes a CPU, a ROM, a RAM, an interface (I/F), and the like. The CPU is configured to execute instructions (programs or routines) stored in the ROM to implement various functions. The driving support apparatus further includes a PVM camera sensor 20, a front camera sensor 30, a vehicle speed sensor 40, a yaw rate sensor 41, a shift position sensor 42, a PVM switch 43, a collision avoidance device 50, and a display device 60, which are each connected to the ECU 10.

The ECU 10 is configured to generate an overhead view image and a traveling direction image (both to be described later) based on image data output from the PVM camera sensor 20 mounted at a plurality of portions of the own vehicle, and to display those images on a display 60a included in the display device 60 in accordance with an operation by a driver of the own vehicle. In addition, the ECU 10 is configured to detect, in a wide range, three-dimensional objects present in front of the own vehicle, diagonally in front of the own vehicle, and on a lateral side of a front-end center portion of the own vehicle, based on image data output from the front camera sensor 30 and a front PVM camera sensor 20F included in the PVM camera sensor 20. The ECU 10 is configured to determine whether or not there is a possibility that the own vehicle may collide with the three-dimensional object based on signals acquired from the sensors 40 and 41. Further, when the ECU 10 determines that there is a possibility of collision, the ECU 10 controls the collision avoidance device 50 to execute collision avoidance control. That is, in the driving support apparatus of the first embodiment, the front PVM camera sensor 20F, which has been used in the related art only for generation of the overhead view image and the traveling direction image, is utilized also for the collision avoidance control. As to be described in detail later, the utilization of the front PVM camera sensor 20F for the collision avoidance control is allowed by applying a lens 21a having a free-form surface to the front PVM camera sensor 20F.

The PVM camera sensor 20 includes the front PVM camera sensor 20F, a left PVM camera sensor 20L, a right PVM camera sensor 20R, and a rear PVM camera sensor 20Re. In the following, those camera sensors are also simply referred to as "camera sensor 20F," "camera sensor 20L," "camera sensor 20R," and "camera sensor 20Re," respectively.

Figure 3:
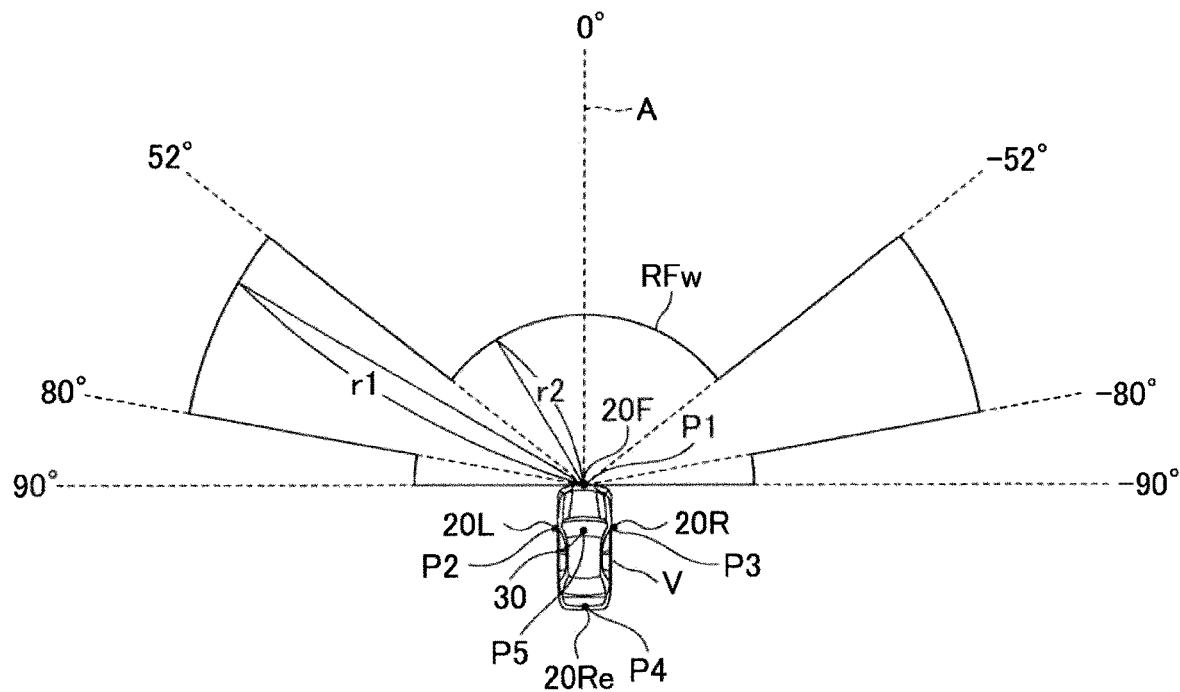
FIG. 3 is a plan view of an image pickup range of the front PVM camera sensor.

The front PVM camera sensor 20F is mounted at a position P1 of the front-end center portion of the own vehicle (see FIG. 3). In more detail, the camera sensor 20F is mounted so that an optical axis of an optical system 21 (described later) of the camera sensor 20F is directed downward by about 10 degrees with respect to a longitudinal axis of the own vehicle at the position P1. The angle at which the camera sensor 20F is mounted is not limited thereto. For example, the camera sensor 20F may be mounted so that the optical axis is directed downward by any angle of from 0 degrees or more to 20 degrees or less with respect to the longitudinal axis at the position P1.

Figure 2:
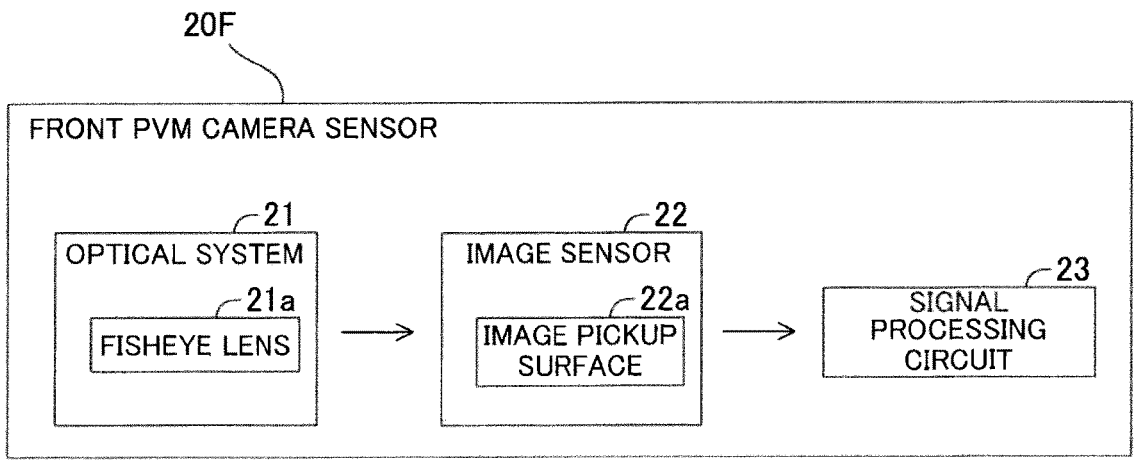
FIG. 2 is a schematic configuration diagram of the front PVM camera sensor.

As illustrated in FIG. 2, the camera sensor 20F includes the optical system 21, an image sensor 22, and a signal processing circuit 23.

The optical system 21 includes a fisheye lens 21a, and is configured to image light from an object onto an image pickup surface 22a to be described later. The fisheye lens 21a is a lens adopting an equidistant projection method, and its outer surface has a predetermined curved surface (non-rotationally symmetric free-form surface). The detailed configuration of the fisheye lens 21a is to be described later.

The image sensor 22 has the image pickup surface 22a in which a plurality of pixels are arrayed at equal intervals in a horizontal direction and a vertical direction (that is, two-dimensionally). The dimensions of the image pickup surface 22a are set so that the number of pixels in the horizontal direction is 1,920 [pix], and the number of pixels in the vertical direction is 1,440 [pix]. Thus, the number of pixels of the image sensor 22 is about 2.8 M [pix]. Those pixels are each configured to convert light received via the optical system 21 into an electrical signal and output the electrical signal. In the following, when the number of pixels of a certain image sensor is described as A×B [pix], A represents the number of pixels in the horizontal direction, and B represents the number of pixels in the vertical direction. The number of pixels of the image sensor 22 is not limited to the number above, and may be, for example, about 3 M (1,920×1,536) [pix]. It is preferred that the number of pixels in the vertical direction be 1,440 [pix] or more.

The signal processing circuit 23 is configured to subject the electrical signal output from the image sensor 22 to processing such as gamma correction, distortion correction and the like, to thereby generate image data of an object (that is, pick up an image of an object) and output the image data to the ECU 10 via the interface (see FIG. 1). The signal processing circuit 23 performs this processing, for example, every time a predetermined calculation cycle elapses, during a period in which an ignition switch is set at an ON position (hereinafter also referred to as "actuation period").

A focal length of the fisheye lens 21a and dimensions of the image pickup surface 22a are designed in advance so that a horizontal angle of view of the camera sensor 20F is 180 degrees and a vertical angle of view thereof is 135 degrees. In this manner, the camera sensor 20F can pick up images of objects positioned in regions on a front side, a diagonally front side, and a lateral side (lateral direction) of the front-end center portion of the own vehicle. As described above, the horizontal angle of view of the camera sensor 20F is very wide. Accordingly, in the following, the image data obtained through image pickup by the camera sensor 20F is referred to as "front wide-area image data." The camera sensor 20F corresponds to an example of a "camera sensor for image generation," and also corresponds to an example of an "image pickup device" mountable to a front part of the vehicle. The horizontal angle of view of the camera sensor 20F corresponds to an example of a "second horizontal angle of view," and the front wide-area image data corresponds to an example of a "surrounding wide-area image data."

Description is continuously given referring back to FIG. 1. The left PVM camera sensor 20L is mounted at a position P2 in the vicinity of a left side mirror of the own vehicle (see FIG. 3). In more detail, the camera sensor 20L is mounted so that an optical axis of an optical system of the camera sensor 20L is directed downward by about 60 degrees with respect to a lateral axis of the own vehicle at the position P2. Here, the lateral axis is an axis extending in a vehicle width direction. That is, the lateral axis is orthogonal to the longitudinal axis and is parallel to the tread.

The right PVM camera sensor 20R is mounted at a position P3 in the vicinity of a right side mirror of the own vehicle (see FIG. 3). In more detail, the camera sensor 20R is mounted so that an optical axis of an optical system of the camera sensor 20R is directed downward by about 60 degrees with respect to the lateral axis of the own vehicle at the position P3.

The rear PVM camera sensor 20Re is mounted at a position P4 of a rear-end center portion of the own vehicle (see FIG. 3). In more detail, the camera sensor 20Re is mounted so that an optical axis of an optical system of the camera sensor 20Re is directed downward by about 10 degrees with respect to the longitudinal axis of the own vehicle at the position P4. The angle at which the camera sensor 20Re is mounted is not limited thereto. For example, the camera sensor 20Re may be mounted so that the optical axis is directed downward by any angle of from 0 degrees or more to 20 degrees or less with respect to the longitudinal axis at the position P4.

The camera sensor 20L includes an optical system, an image sensor, and a signal processing circuit (all not shown). The optical system includes a fisheye lens (not shown) adopting an equidistant projection method. The functions of the optical system, the image sensor, and the signal processing circuit of the camera sensor 20L are similar to the functions of the optical system 21, the image sensor 22, and the signal processing circuit 23 of the camera sensor 20F, respectively, but are different therefrom in the following two points.

The fisheye lens of the camera sensor 20L has a rotationally symmetric curved surface.

The number of pixels of the image sensor of the camera sensor 20L is about 1.2 M (1,280×960) [pix], which is smaller than the number of pixels of the image sensor 22 (about 2.8 M [pix]).

In the following, the "number of pixels of the image sensor" is also simply referred to as the "number of pixels of the camera sensor."

A focal length of the fisheye lens and dimensions of an image pickup surface of the camera sensor 20L are designed in advance so that the horizontal angle of view of the camera sensor 20L is 180 degrees and the vertical angle of view thereof is 135 degrees. In this manner, the camera sensor 20L can pick up an image of an object positioned in a left lateral region of the own vehicle. In the following, the image data obtained through image pickup by the camera sensor 20L is referred to as "left wide-area image data."

The camera sensors 20R and 20Re have substantially the same configuration as that of the camera sensor 20L, and hence detailed description thereof is omitted. The camera sensors 20R and 20Re each have a horizontal angle of view of 180 degrees and a vertical angle of view of 135 degrees. In this manner, the camera sensor 20R can pick up an image of an object positioned in a right lateral region of the own vehicle. The camera sensor 20Re can pick up images of objects behind the own vehicle, diagonally behind the own vehicle, and on a lateral side of the rear-end center portion of the own vehicle. In the following, the image data obtained through pickup by the camera sensor 20R and the image data obtained through pickup by the camera sensor 20Re are referred to as "right wide-area image data" and "rear wide-area image data," respectively. The camera sensor 20L, the camera sensor 20R, and the camera sensor 20Re correspond to examples of a "left image pickup device," a "right image pickup device," and a "rear image pickup device," respectively.

The front camera sensor 30 (hereinafter also simply referred to as "camera sensor 30") is mounted at a position P5 of a back surface of a room mirror (inner mirror or rear-view mirror) of the own vehicle so that the camera sensor 30 is positioned at a center in the vehicle width direction of the own vehicle (see FIG. 3). In more detail, the camera sensor 30 is mounted so that an optical axis of an optical system (described later) of the camera sensor 30 is substantially parallel to the longitudinal axis of the own vehicle at the position P5. The camera sensor 30 includes an optical system, an image sensor, and a signal processing circuit (all not shown). The optical system includes a wide-angle lens (not shown) having a rotationally symmetric curved surface. The number of pixels of the image sensor is about 1.2 M (1,280×960) [pix], which is the same as the number of pixels of the image sensor of each of the camera sensors 20L, 20R, and 20Re. The functions of the optical system, the image sensor, and the signal processing circuit of the camera sensor 30 are similar to the functions of the optical system, the image sensor, and the signal processing circuit of each of the camera sensors 20F, 20L, 20R, and 20Re.

A focal length of the wide-angle lens and dimensions of an image pickup surface of the camera sensor 30 are designed in advance so that the horizontal angle of view of the camera sensor 30 is 100 degrees and the vertical angle of view thereof is 75 degrees. In this manner, the camera sensor 30 can pick up an image of an object in front of the own vehicle. The horizontal angle of view of the camera sensor 30 is narrower than the horizontal angle of view of the camera sensor 20F. Accordingly, in the following, the image data obtained through image pickup by the camera sensor 30 is referred to as "front narrow-area image data." The camera sensor 20F and the camera sensor 30 form an image pickup system. The horizontal angle of view of the camera sensor 30 corresponds to an example of a "first horizontal angle of view."

The vehicle speed sensor 40 is configured to generate a signal corresponding to a traveling speed (vehicle speed) of the own vehicle. The ECU 10 acquires the signal generated by the vehicle speed sensor 40 to calculate the vehicle speed based on the signal.

The yaw rate sensor 41 is configured to generate a signal corresponding to a yaw rate acting on the own vehicle. The ECU 10 acquires the signal generated by the yaw rate sensor 41 to calculate the yaw rate based on the signal.

The shift position sensor 42 is configured to generate a signal corresponding to a shift position (D, N, R, or P) of a shift lever (not shown). The ECU 10 acquires the signal generated by the shift position sensor 42 to detect the shift position based on the signal.

The PVM switch 43 is provided in the vicinity of a steering wheel (not shown), and may be pressed by the driver when a PVM image (described later) is to be displayed on the display 60a of the display device 60. The PVM switch 43 is configured to generate an ON signal when being pressed by the driver, and to generate an OFF signal when not being pressed by the driver. The ECU 10 acquires the signal generated by the PVM switch 43 to detect whether the PVM switch 43 is in the ON state or the OFF state based on the signal.

The collision avoidance device 50 is configured to execute the collision avoidance control when receiving a collision avoidance command from the ECU 10. The collision avoidance control is control of executing, when a three-dimensional object that may collide with the own vehicle is present in front of, diagonally in front of, or on the lateral side of the front-end center portion of the own vehicle, an alarm control of generating an alarm for the driver, an automatic braking control of automatically applying a braking force to the own vehicle, and/or an automatic steering control of automatically changing a steered angle of steered wheels of the own vehicle. Those controls are all well known, and hence detailed description thereof is omitted.

The display device 60 includes the display 60a provided at a position viewable by the driver. The display device 60 is configured to display the PVM image on the display 60a when receiving a display command to display the PVM image (described later) from the ECU 10. In the first embodiment, as the display 60a, a touch panel included in a navigation system (not shown) is used. The resolution of the display 60a is set to 1,280 [pix]8960 [pix]. As the display 60a, a display other than the touch panel of the navigation system may be used.

The ECU 10 is configured to acquire, from the camera sensors 20F, 20L, 20R, and 20Re and the camera sensor 30, the "front wide-area image data," the "left wide-area image data," the "right wide-area image data," the "rear wide-area image data," and the "front narrow-area image data," respectively, and to perform (1) PVM image generation and display command transmission processing, and (2) three-dimensional object detection, collision determination, and collision avoidance command transmission processing, based on the acquired image data (that is, by subjecting the image data to image processing). Specific description is given below.

(1) PVM Image Generation and Display Command Transmission Processing

The ECU 10 generates a PVM image. Here, a PVM refers to a function of displaying a surrounding region of the own vehicle on a display screen (in the first embodiment, the display 60a) when the own vehicle travels at a relatively low speed by a driver's driving operation. The PVM image refers to an image to be generated for the PVM, and includes, for example, an overhead view image and a traveling direction image. The traveling direction image includes a forward direction image and a backward direction image.

The overhead view image is generated by combining the front wide-area image data, the left wide-area image data, the right wide-area image data, the rear wide-area image data, and a planar image of the own vehicle (image of a plan view of the own vehicle) which is stored in advance in the ROM of the ECU 10. Here, the overhead view image means an image that looks as if the own vehicle and its surrounding region are looked down from directly above, and does not mean an image of an actual overhead view. The ECU 10 generates the overhead view image every time the calculation cycle elapses during the actuation period.

The forward direction image is generated based on the front wide-area image data. The forward direction image is a picked-up image of the front side, the diagonally front side, and the lateral side of the front-end center portion of the own vehicle. The ECU 10 generates the forward direction image every time the calculation cycle elapses, during a period in which the own vehicle travels forward, or the own vehicle traveling forward is stopped and the stopped state is maintained (that is, during a period in which the shift position is D or N).

The backward direction image is generated based on the rear wide-area image data. The backward direction image is a picked-up image of the rear side, the diagonally rear side, and the lateral side of the rear-end center portion of the own vehicle. The ECU 10 generates the backward direction image every time the calculation cycle elapses, during a period in which the own vehicle travels backward, or the own vehicle traveling backward is stopped and the stopped state is maintained (that is, during a period in which the shift position is R).

The ECU 10 displays each of those images in a predetermined region of the display 60a under a predetermined condition described below. Specifically, when the ECU 10 determines that the PVM switch 43 has been pressed in a case in which the vehicle speed is a predetermined vehicle speed threshold value (for example, 12 [km/h]) or less and the shift position is D or N based on the information acquired from the vehicle speed sensor 40, the shift position sensor 42, and the PVM switch 43, the ECU 10 transmits, to the display device 60, the display command to display the overhead view image and the forward direction image. When the display device 60 receives the display command, the display device 60 displays each of the overhead view image and the forward direction image in the predetermined region of the display 60a (not shown). Here, the "predetermined region" refers to a pre-sectioned region having a fixed size, and, in the first embodiment, refers to each of a left region and a right region obtained by dividing the display 60a into two parts. The display device 60 displays the overhead view image in the left region, and displays the forward direction image in the right region.

Meanwhile, when the ECU 10 determines that the PVM switch 43 has been pressed in a case in which the vehicle speed is the vehicle speed threshold value or less and the shift position is R based on the information acquired from the vehicle speed sensor 40, the shift position sensor 42, and the PVM switch 43, the ECU 10 transmits, to the display device 60, the display command to display the overhead view image and the backward direction image. When the display device 60 receives the display command, the display device 60 displays the overhead view image in the above-mentioned left region of the display 60a, and displays the backward direction image in the above-mentioned right region (not shown).

At this time, a mark for switching a display image is displayed on the display 60a. When an occupant touches the mark, the ECU 10 transmits a display command to display the backward direction image to the display device 60. When the display device 60 receives the display command, the display device 60 displays the backward direction image in the entire area of the display 60a (not shown). When the occupant touches the above-mentioned mark again, the overhead view image and the backward direction image are displayed on the display 60a again. As described above, the number of pixels of the camera sensor 20Re is equivalent to the resolution of the display 60a. Therefore, even when only the backward direction image is displayed on the display 60a, the image may be appropriately displayed.

(2) Three-Dimensional Object Detection, Collision Determination, and Collision Avoidance Command Transmission Processing The ECU 10 analyzes the front wide-area image data and the front narrow-area image data to calculate presence or absence of a three-dimensional object and a relative relationship between the own vehicle and the three-dimensional object (distance from the own vehicle to the three-dimensional object, orientation of the three-dimensional object with respect to the own vehicle, relative speed of the three-dimensional object with respect to the own vehicle, and the like). In other words, the ECU 10 detects each of the three-dimensional objects present in the image pickup range of the camera sensor 20F and the image pickup range of the camera sensor 30. The three-dimensional object includes a moving object (for example, other moving vehicles and moving pedestrians) and a stationary object (for example, other stopping vehicles, stopping pedestrians, and buildings). In the following, first, the image pickup ranges of the camera sensors 20F and 30 are each described, and then the processing (2) of the ECU 10 is described.

A range RFw of FIG. 3 is a plan view of the image pickup range of the camera sensor 20F (that is, a range in which the ECU 10 can detect the three-dimensional object based on the front wide-area image data). As illustrated in FIG. 3, a reference orientation is set to an orientation of a reference axis A that is an axis passing through the position P1 and being parallel to a longitudinal axis of an own vehicle V. The reference axis A matches the optical axis of the optical system 21 in plan view of the own vehicle V. In the following, in the horizontal angle of view, an azimuth angle θf on the left side of the reference axis A is defined to have a positive value, and an azimuth angle θf on the right side of the reference axis A is defined to have a negative value. In addition, in the vertical angle of view, an angle above the optical axis is defined to have a positive value, and an angle below the optical axis is defined to have a negative value. As described above, the optical axis of the camera sensor 20F is tilted downward by about 10 degrees with respect to the longitudinal axis, and the vertical angle of view is 135 degrees. Accordingly, the reference axis A is included in the vertical angle of view.

The range RFw has a fan shape with a radius r1 in a left first range and a right first range. The left first range corresponds to an azimuth angle range of $52°≤θf≤80°$, and the right first range corresponds to an azimuth angle range of $-80°≤θf≤-52°$ (in the following, the left first range and the right first range are sometimes collectively referred to as "first range"). The range RFw has a fan shape with a radius r2 in a second range of the horizontal angle of view excluding the first range (that is, $0°≤θf<52°$, $80°<θf≤90°$, $-90°≤θf<-80°$, and $-52°<θf≤0°$). With the shape of the range RFw, a detection limit distance (r1) for the three-dimensional object in the first range is longer than a detection limit distance (r2) for the three-dimensional object in the second range. This is caused by the configuration of the fisheye lens 21a. The first range corresponds to an example of a "diagonal lateral azimuth angle range", and the second range corresponds to an example of a "residual azimuth angle range."

Figure 4:
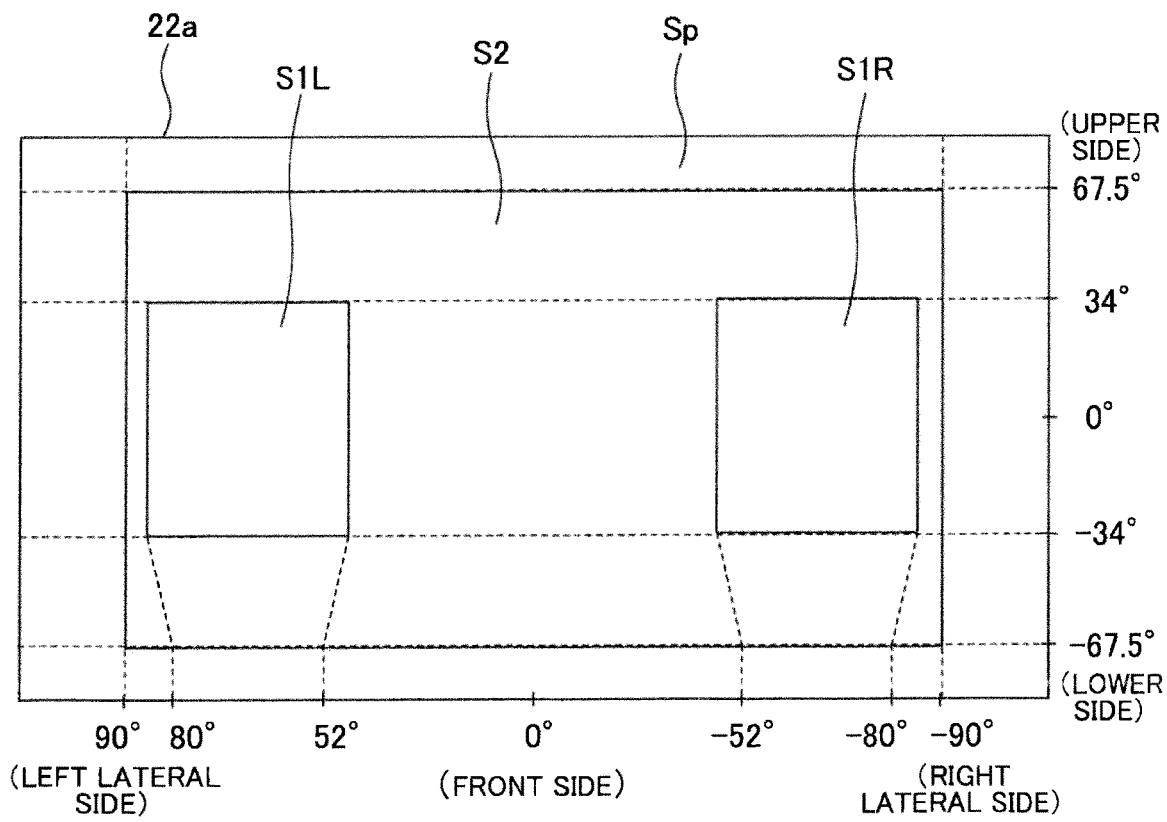
FIG. 4 is a view for illustrating that, in an image pickup surface, left first light and right first light are imaged so as to be more expanded in a horizontal direction as compared to second light.

Specific description is given with reference to FIG. 4. As illustrated in FIG. 4, the image pickup surface 22a includes a region S1L, a region S1R, and a region S2. The region S1L is a region in which left first light being light from an "object present in the left first range and also present in a predetermined angle range in the vertical angle of view" is to be imaged onto the image pickup surface 22a (the above-mentioned predetermined angle range is hereinafter referred to as "first specific vertical range"). The region S1R is a region in which right first light being light from an "object present in the right first range and also present in the first specific vertical range" is to be imaged onto the image pickup surface 22a. The region S2 is a region in which second light being light from an "object present in the remaining angle range of the horizontal angle of view and the vertical angle of view" is to be imaged onto the image pickup surface 22a. The first specific vertical range may be set as a range including the reference axis A and also including substantially the center of the vertical angle of view. In the first embodiment, the first specific vertical range is from −34 degrees or more to 34 degrees or less. The optical system 21 is configured to image light from an object also onto a surrounding region Sp (region of the image pickup surface 22a on the outer side of the region S2). However, the surrounding region Sp is susceptible to noise, and hence electrical signals of pixels forming the surrounding region Sp are not used for generation of the image data.

The fisheye lens 21a is configured to image, when light from an object is to be imaged onto the image pickup surface 22a via the optical system 21, the left first light and the right first light onto the image pickup surface 22a so as to be more expanded in the horizontal direction as compared to the second light. An expansion rate of the left first light is constant over the first specific vertical range, and an expansion rate of the right first light is constant over the first specific vertical range. The expansion rates of the left first light and the right first light are equal to each other. Accordingly, the region S1L and the region S1R have rectangular shapes that are congruent to each other. The left first light and the right first light are not expanded in the vertical direction. In the following, the region S1L and the region S1R are sometimes collectively referred to as "region S1." The region S1 corresponds to an example of a "specific region" or a "first region," and the region S2 corresponds to an example of a "residual region" or a "second region."

In other words, the fisheye lens 21a has a free-form surface processed so that a horizontal pixel density in the region S1 becomes larger than the horizontal pixel density in any region of the region S2. Here, the horizontal pixel density is the number of pixels per unit horizontal angle of view. In general, a resolution in the horizontal direction (ability to detect the three-dimensional object by the ECU 10 analyzing the image data) is increased as the horizontal pixel density is increased. Accordingly, with the above-mentioned configuration, the resolution in the horizontal direction in the region S1 becomes higher than the resolution in the horizontal direction in the region S2. As a result, the detection limit distance (r1) for the three-dimensional object in the first range becomes longer than the detection limit distance (r2) for the three-dimensional object in the second range. A lower-limit azimuth angle (52 degrees) of the left first range and an upper-limit azimuth angle (−52 degrees) of the right first range are determined based on boundary azimuth angles (50 degrees and −50 degrees) being azimuth angles (see FIG. 6) at boundary lines defining the horizontal angle of view (100 degrees) of the front camera sensor 30.

Figure 5:
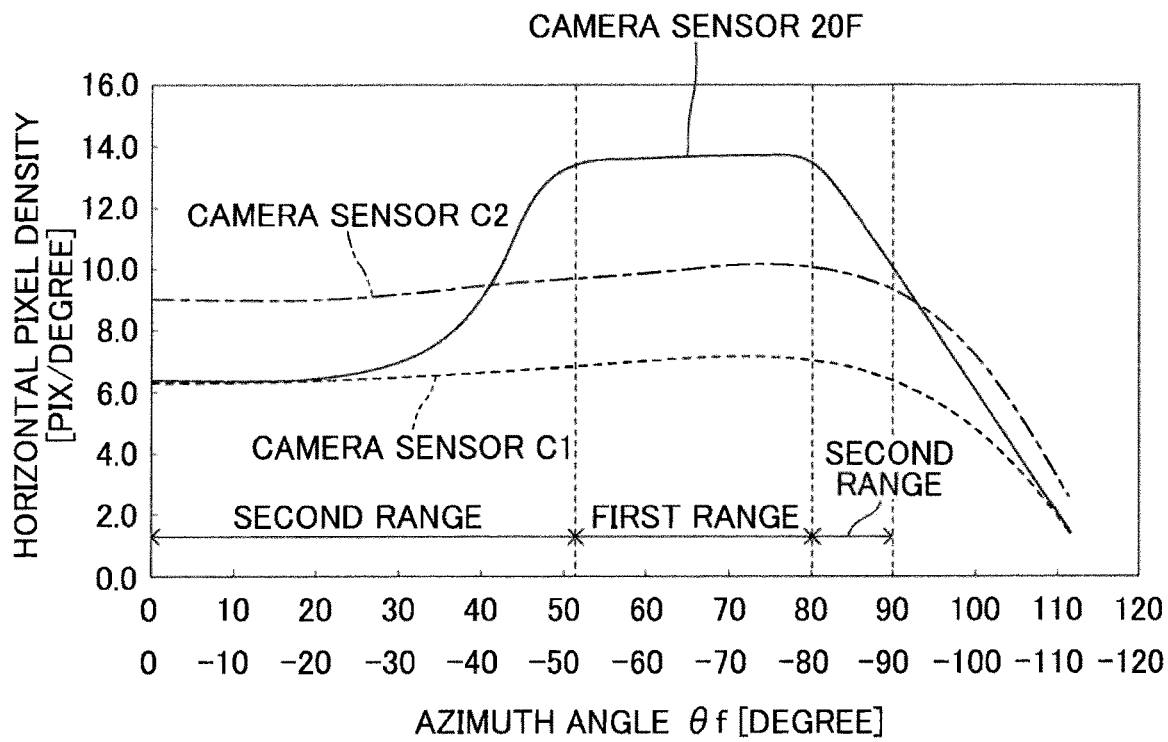
FIG. 5 is a graph for showing a relationship between an azimuth angle and a horizontal pixel density of the front PVM camera sensor.

A relationship between the detection limit distance for the three-dimensional object and the horizontal pixel density is specifically described with reference to FIG. 5. FIG. 5 is a graph for showing a relationship between the azimuth angle and the horizontal pixel density (strictly speaking, horizontal pixel density at a certain angle (for example, 10 degrees) within the first specific vertical range) of each of the camera sensor 20F and camera sensors C1 (see the broken line) and C2 (see the long-dashed short-dashed line) being comparative examples.

Lenses included in optical systems of the camera sensors C1 and C2 are both fisheye lenses. However, each of those fisheye lenses is different from the fisheye lens 21a of the camera sensor 20F in that the fisheye lens has a rotationally symmetric curved surface.

The number of pixels of the camera sensor C1 is about 1.2 M (1,280×960) [pix], and the horizontal angle of view thereof is 180 degrees. That is, the camera sensor C1 has substantially the same configuration as those of the camera sensors 20L, 20R, and 20Re.

The number of pixels of the camera sensor C2 is about 2.8 M (1,920×1,440) [pix], and the horizontal angle of view thereof is 180 degrees. That is, the camera sensor C2 has substantially the same configuration as that of the camera sensor 20F except that the fisheye lens does not have the free-form surface.

As described above, the camera sensor 20F is configured so that the expansion rates in the horizontal direction of the left first light and the right first light are constant over the first specific vertical range. The same holds true also in the camera sensors C1 and C2. Accordingly, the relationship between the azimuth angle and the horizontal pixel density of each of the camera sensors 20F, C1, and C2 is unchanged over the first specific vertical range.

The optical system included in each of the camera sensors 20F, C1, and C2 is configured to be capable of imaging also light from an object present in azimuth angle ranges of 90°<θf≤about 110° and about −110°<θf<−90° onto each image pickup surface. Accordingly, the graph of FIG. 5 also shows the horizontal pixel densities in those azimuth angle ranges. However, electrical signals of pixels corresponding to those azimuth angle ranges in the image pickup surface are not used for generation of the image data.

As described above, the fisheye lenses of the camera sensors C1 and C2 have rotationally symmetric curved surfaces. Accordingly, as shown in FIG. 5, within the horizontal angle of view (−90°≤θf≤90°), the degrees of fluctuations (variations) of the horizontal pixel densities of the camera sensors C1 and C2 are relatively small. In contrast, the fisheye lens 21a of the camera sensor 20F has a free-form surface processed as described above. Accordingly, the horizontal pixel density of the camera sensor 20F is larger than the horizontal pixel density of the camera sensor C2 (that is, a camera sensor having the same number of pixels as that of the camera sensor 20F) in the azimuth angle ranges of 45°≤θf≤90° and −90°≤θf≤−45°. In particular, in the first range, the horizontal pixel density of the camera sensor 20F is about 1.4 times as large as the horizontal pixel density of the camera sensor C2. In general, within a predetermined azimuth angle range, the detection limit distance for the three-dimensional object and the horizontal pixel density at any angle within the first specific vertical range are substantially proportional to each other. Accordingly, in the first range, the detection limit distance r1 (see FIG. 3) for the three-dimensional object of the camera sensor 20F is about 1.4 times (about 42 [m]) of the detection limit distance (about 30 [m]) for the three-dimensional object of the camera sensor C2.

Meanwhile, in the second range, the horizontal pixel density of the camera sensor 20F is maintained to be equivalent to or larger than the horizontal pixel density of the camera sensor C1. Accordingly, an image quality of the PVM image is prevented from being degraded due to the fisheye lens 21a having the free-form surface. In the second range, the detection limit distance r2 (see FIG. 3) for the three-dimensional object of the camera sensor 20F is substantially equal to the detection limit distance (about 20[m]) for the three-dimensional object of the camera sensor C1.

As described above, the camera sensor 20F includes the fisheye lens 21a having the above-mentioned free-form surface. Thus, while the image quality of the PVM image is maintained at the same level as that in the related art (in other words, without causing the number of pixels of the camera sensor 20F to be over-performance with respect to the resolution of the display 60a), in a specific range of the horizontal angle of view (in the first embodiment, the first range), the detection limit distance for the three-dimensional object can be greatly extended as compared to the camera sensor C2 having the same number of pixels as that of the camera sensor 20F.

Figure 6:
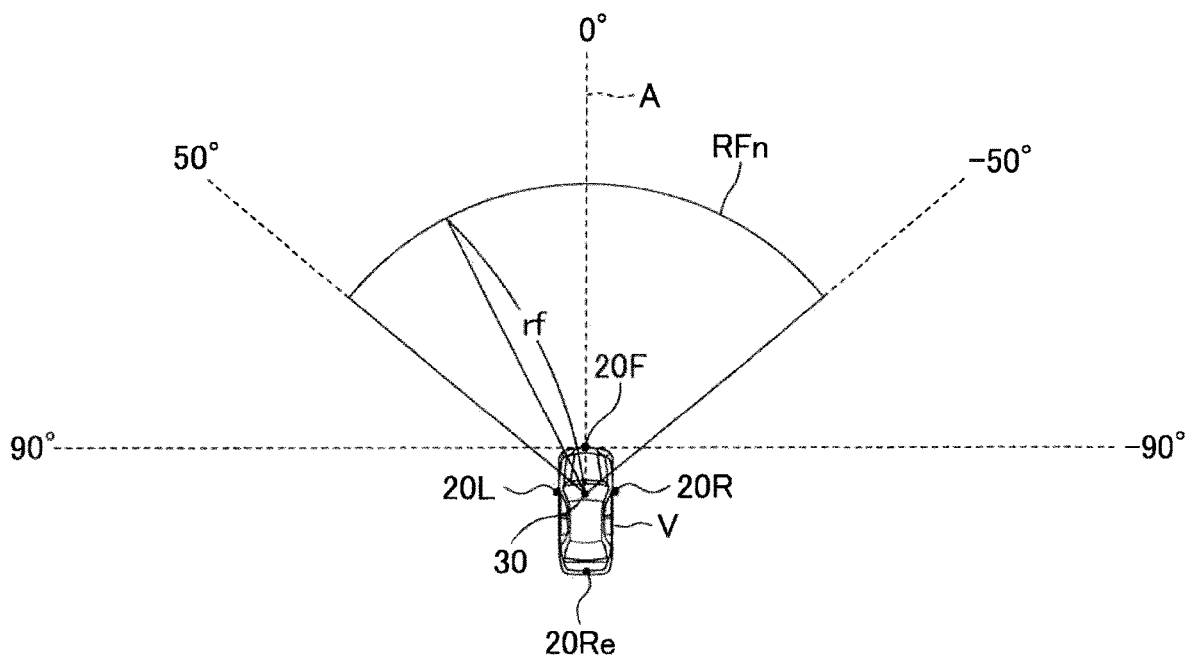
FIG. 6 is a plan view of an image pickup range of a front camera sensor.

A range RFn of FIG. 6 is a plan view of the image pickup range of the camera sensor 30 (that is, a range in which the ECU 10 can detect the three-dimensional object based on the front narrow-area image data). As illustrated in FIG. 6, the range RFn has a fan shape with a central angle of 100 degrees and a radius "rf" of about 35 [m]. A bisector of the central angle is positioned on the reference axis A.

As illustrated in FIG. 3 and FIG. 6, the range RFw and the range RFn partially overlap each other. In the overlapping part, the ECU 10 detects the three-dimensional object by integrating (fusing) information calculated based on the front wide-area image data and information calculated based on the front narrow-area image data.

Subsequently, the ECU 10 determines whether or not there is a possibility that the own vehicle may collide with the three-dimensional object for all of the detected three-dimensional objects. Specifically, the ECU 10 calculates a turning radius of the own vehicle based on the vehicle speed acquired from the vehicle speed sensor 40 and the yaw rate acquired from the yaw rate sensor 41, and calculates a path of the own vehicle based on the turning radius. In addition, the ECU 10 calculates a path of each three-dimensional object based on transition of a position (orientation and distance) of each three-dimensional object. The ECU 10 determines, based on the path of the own vehicle and the path of each three-dimensional object, whether or not the own vehicle collides with any three-dimensional object when the own vehicle travels while maintaining the current traveling state and each three-dimensional object moves while maintaining the current moving state. When the three-dimensional object is a stationary object, the ECU 10 determines whether or not the own vehicle collides with the three-dimensional object based on the path of the own vehicle and the current position of the three-dimensional object.

When the ECU 10 determines that the own vehicle is to collide with the three-dimensional object, the ECU 10 calculates a time to collision (TIC) which is an estimated time that remains until the own vehicle collides with the three-dimensional object. The TTC may be calculated by dividing a distance from the own vehicle to a position at which the collision is estimated to occur by the vehicle speed. When the TTC is a predetermined TTC threshold value or less, the ECU 10 determines that there is a possibility that the own vehicle may collide with the three-dimensional object. In this case, the ECU 10 transmits a collision avoidance command to the collision avoidance device 50. When the collision avoidance device 50 receives the collision avoidance command, the collision avoidance device 50 executes at least one of the above-mentioned collision avoidance controls (alarm control, automatic braking control, and/or automatic steering control) depending on the situation. Meanwhile, when the TTC is larger than the TTC threshold value, the ECU 10 determines that the possibility that the own vehicle collides with the three-dimensional object is low, and does not transmit the collision avoidance command. The ECU 10 executes the processing (2) every time the calculation cycle elapses during the actuation period.

Figure 7:
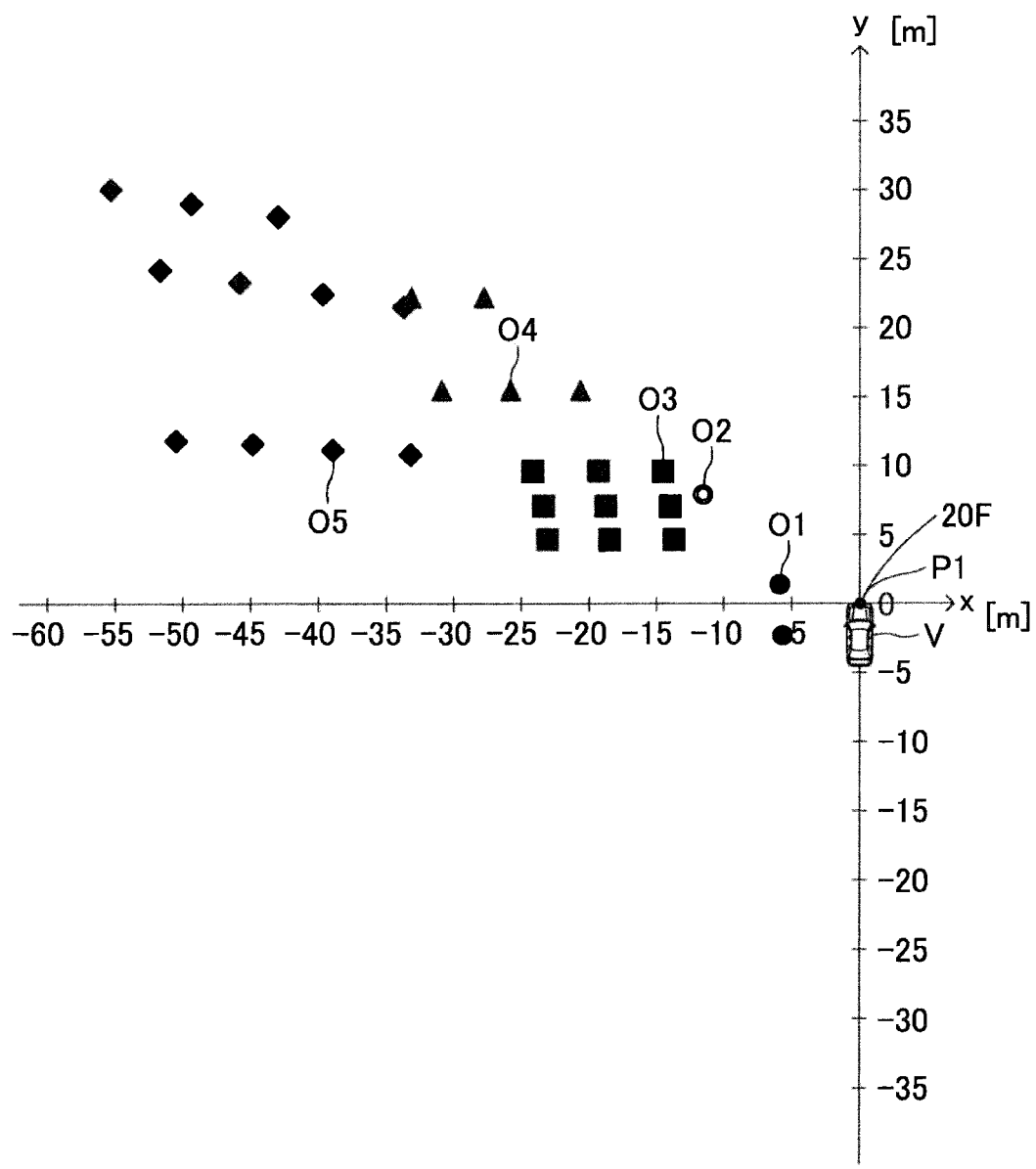
FIG. 7 is a plan view for illustrating a relative distribution with respect to an own vehicle of various types of three-dimensional objects with which, when the own vehicle enters an intersection, the own vehicle is to collide after an elapse of three seconds.

The camera sensor 20F including the fisheye lens 21a as described above is particularly useful when the own vehicle turns right or left at an intersection, or when the own vehicle travels straight through an intersection without traffic lights. Specific description is given with reference to FIG. 7 and FIG. 8. FIG. 7 shows a situation in which the own vehicle V enters an intersection. Illustration of roads, dividing lines, and the like is omitted. For the own vehicle V, an xy coordinate system in which the position P1 is set as an origin is set. The scale of the own vehicle V and the scale of the divisions of the xy coordinate system are different from each other. Three-dimensional objects O1 to O5 are all moving objects. Specifically, the three-dimensional object O1 is a bicycle moving in a +y axis direction (that is, in the same direction as the current traveling direction of the own vehicle V) at an average speed. The three-dimensional object O2 is a pedestrian moving in the +y axis direction at an average speed. The three-dimensional object O3 is an electric motorcycle moving in a +x axis direction at a vehicle speed within a predetermined vehicle speed range. The three-dimensional object O4 is a vehicle moving in the +x axis direction at a vehicle speed within a range of from 30 [km/h] to 60 [km/h]. The three-dimensional object O5 is a vehicle moving in the +x axis direction at a relatively high speed.

The three-dimensional objects O1 and O2 are three-dimensional objects with which, when the own vehicle V turns left at the intersection at an "average vehicle speed at the time of turning left," the own vehicle V is to collide after an elapse of three seconds. The three-dimensional object O3 is a three-dimensional object with which, when the own vehicle V travels straight through an intersection without traffic lights at an "average vehicle speed at the time of traveling straight through an intersection without traffic lights," the own vehicle V is to collide after an elapse of three seconds. The three-dimensional object O4 is a three-dimensional object with which, when the own vehicle V travels straight through the intersection without traffic lights at a vehicle speed within a range of from 30 [km/h] to 60 [km/h], the own vehicle V is to collide after an elapse of three seconds. The three-dimensional object O5 is a three-dimensional object with which, when the own vehicle V travels straight through the intersection without traffic lights at a relatively low speed, the own vehicle V is to collide after an elapse of three seconds. That is, FIG. 7 shows a relative distribution with respect to the own vehicle V of various types of three-dimensional objects with which, when the own vehicle V turns left at the intersection, or when the own vehicle V travels straight through the intersection without traffic lights at various vehicle speeds, the own vehicle V is to collide after an elapse of three seconds.

Figure 8:
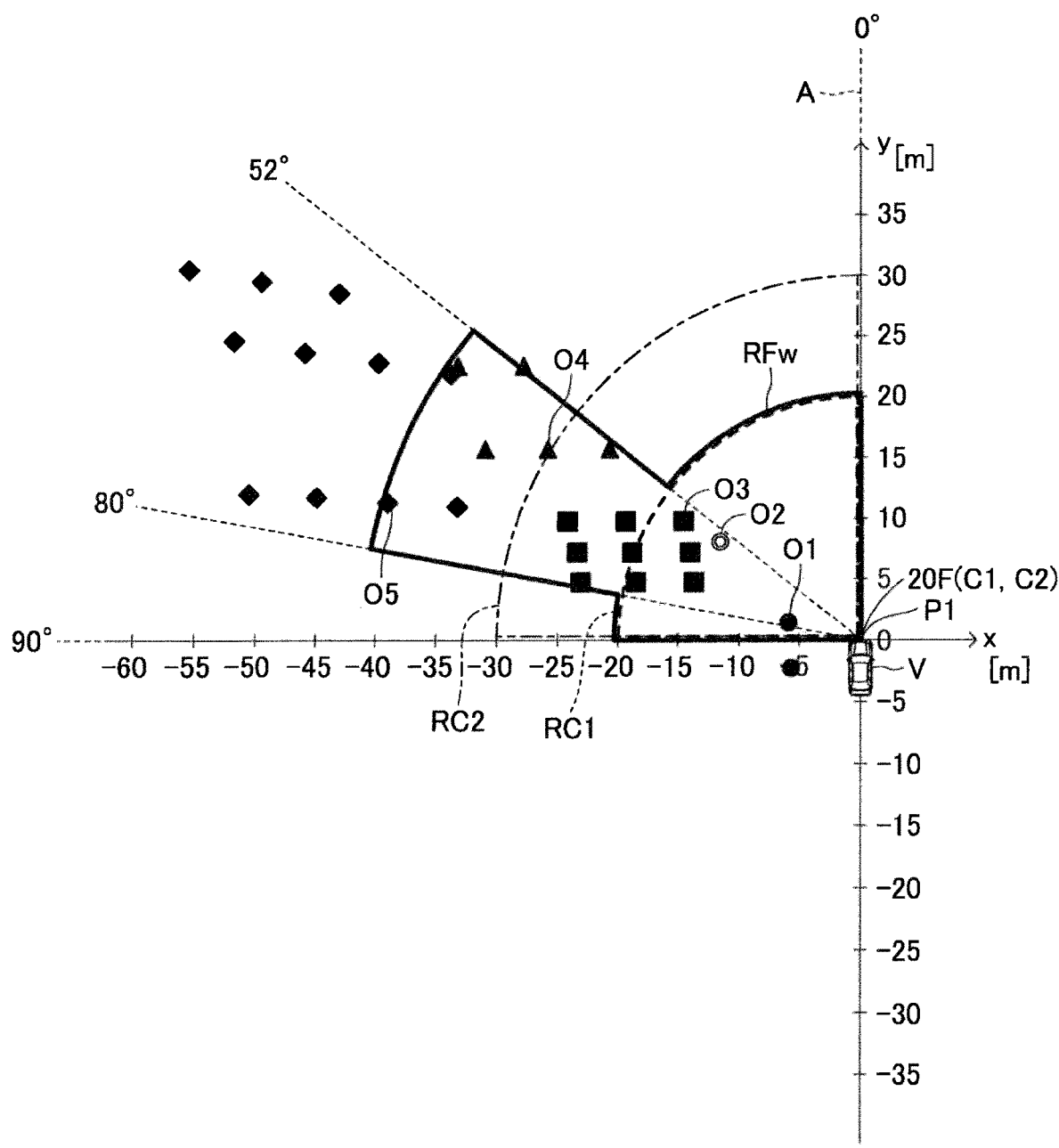
FIG. 8 is a plan view in which the image pickup range of the front PVM camera sensor and image pickup ranges of two camera sensors being comparative examples are superimposed on FIG. 7.

FIG. 8 is a view in which the range RFw, a range RC1, and a range RC2 in an azimuth angle range of 0°≤θf≤90° are superimposed on FIG. 7. Here, the range RC1 and the range RC2 are each a plan view of an image pickup range in a case in which each of the camera sensors C1 and C2 (see FIG. 5) is mounted at the position P1 of the own vehicle V. As illustrated in FIG. 7, the three-dimensional objects O1 to O5 are distributed in a biased manner in a specific azimuth angle range of the own vehicle V. With reference to FIG. 8, this specific azimuth angle range matches the left first range. Although not shown in FIG. 7 and FIG. 8, almost all of various types of three-dimensional objects with which, when the own vehicle V turns right at an intersection or when the own vehicle V travels straight through an intersection without traffic lights at various vehicle speeds, the own vehicle V is to collide after an elapse of three seconds are distributed in a biased manner in a specific azimuth angle range of the own vehicle V similarly to the three-dimensional objects O1 to O5, and this specific azimuth angle range is considered to match the right first range.

As illustrated in FIG. 8, the camera sensor 20F is configured to include the fisheye lens 21a having the above-mentioned free-form surface so that the detection limit distance for the three-dimensional object in the first range is longer than the detection limit distance for the three-dimensional object in the second range. Accordingly, the camera sensor 20F can pick up the image of the "three-dimensional object present diagonally in front of the vehicle" over a longer distance relative to the "three-dimensional objects present in front of and on the lateral side of the front-end center portion of the vehicle." The image of the "three-dimensional object present in front of the vehicle" may be picked up by the camera sensor 30 over a relatively long distance (see FIG. 6).

In addition, the fisheye lens 21a is configured so that the horizontal pixel density in the region S2 of the image pickup surface 22a becomes smaller than the horizontal pixel density in the region S1 thereof. Accordingly, as compared to a configuration in which the horizontal pixel density in the region S2 is set to be equivalent to the horizontal pixel density in the region S1, a great increase of the number of pixels of the image sensor 22 can be suppressed. Therefore, according to the configuration of the camera sensor 20F, the image of the three-dimensional object present diagonally in front of the own vehicle V can be appropriately picked up without greatly increasing the number of pixels of the image sensor 22.

More specifically, in the range RFw, as compared to the range RC2 (plan view of the image pickup range of the camera sensor C2 having the same number of pixels as that of the camera sensor 20F), the detection limit distance for the three-dimensional object is longer in the first range, and is shorter in the second range. Here, as illustrated in FIG. 8, almost no three-dimensional object with which the own vehicle V may collide when entering the intersection is present in the second range. Accordingly, when, as in the range RFw, the detection limit distance is extended in an azimuth angle range in which the three-dimensional objects are distributed in a biased manner, and the detection limit distance is reduced in an azimuth angle range in which almost no three-dimensional object is present, an image of a three-dimensional object present in a desired azimuth angle range (that is, various types of three-dimensional objects with which the own vehicle V may collide when turning right or left at the intersection or when traveling straight through the intersection without traffic lights at various vehicle speeds) can be appropriately picked up over a relatively long distance, without greatly increasing the number of pixels of the image sensor 22.

Here, the TTC threshold value to be used for determination on whether or not to execute the collision avoidance control is generally set to any value that is equal to or smaller than three seconds. Accordingly, with the above-mentioned configuration, the collision avoidance control can be appropriately executed with respect to the three-dimensional object present diagonally in front of the own vehicle. That is, the related-art driving support apparatus can only detect the three-dimensional object present in front of the own vehicle (typically, in the horizontal angle of view of −50°≤θf≤50°). Accordingly, for example, regarding the three-dimensional objects present diagonally in front of the own vehicle V as the three-dimensional objects O1 to O5, until the own vehicle turns left so that the three-dimensional object(s) O1 and/or O2 is/are positioned in front of the own vehicle, or until the own vehicle further travels straight so that the three-dimensional objects O3 to O5 are positioned in front of the own vehicle, the three-dimensional objects O1 to O5 cannot be detected, and the TIC may already be equal to or smaller than the TTC threshold value at the time point of detection. In contrast, according to the driving support apparatus including the camera sensor 20F, the three-dimensional object present diagonally in front of the own vehicle can be detected before the TIC becomes equal to or smaller than the TTC threshold value. Accordingly, the collision avoidance control can be appropriately executed for those three-dimensional objects.

In particular, the camera sensor 20F also functions as a camera sensor to be used for generation of the PVM image. Accordingly, it is only required to partially change the specification of the related-art front PVM camera sensor (specifically, change the fisheye lens to the fisheye lens 21a, and change the number of pixels of the image sensor from about 1.2 M [pix] to about 2.8 M [pix]), and it is not required to newly introduce a camera sensor. Therefore, the camera sensor 20F can be achieved with relatively low cost.

In addition, in the camera sensor 20F, although the free-form surface of the fisheye lens 21a is formed so that the horizontal pixel density in the region S1 of the image pickup surface 22a becomes larger than the horizontal pixel density in the region S2 thereof, with reference to FIG. 5, the horizontal pixel density in the region S2 is maintained to be equal to or larger than the horizontal pixel density of the image pickup surface in the camera sensor 20Re (that is, a camera sensor having substantially the same configuration as that of the camera sensor C1). With this configuration, the image quality of the PVM image is prevented from being degraded due to the fisheye lens 21a having the above-mentioned free-form surface.

Second Embodiment

Next, a driving support apparatus including a left PVM camera sensor and a right PVM camera sensor each serving as an image pickup device according to a second embodiment of the present invention is described with reference to the drawings. In the following, the same configurations as those of the first embodiment are denoted by the same reference symbols, and detailed description thereof is omitted.

Figure 9:
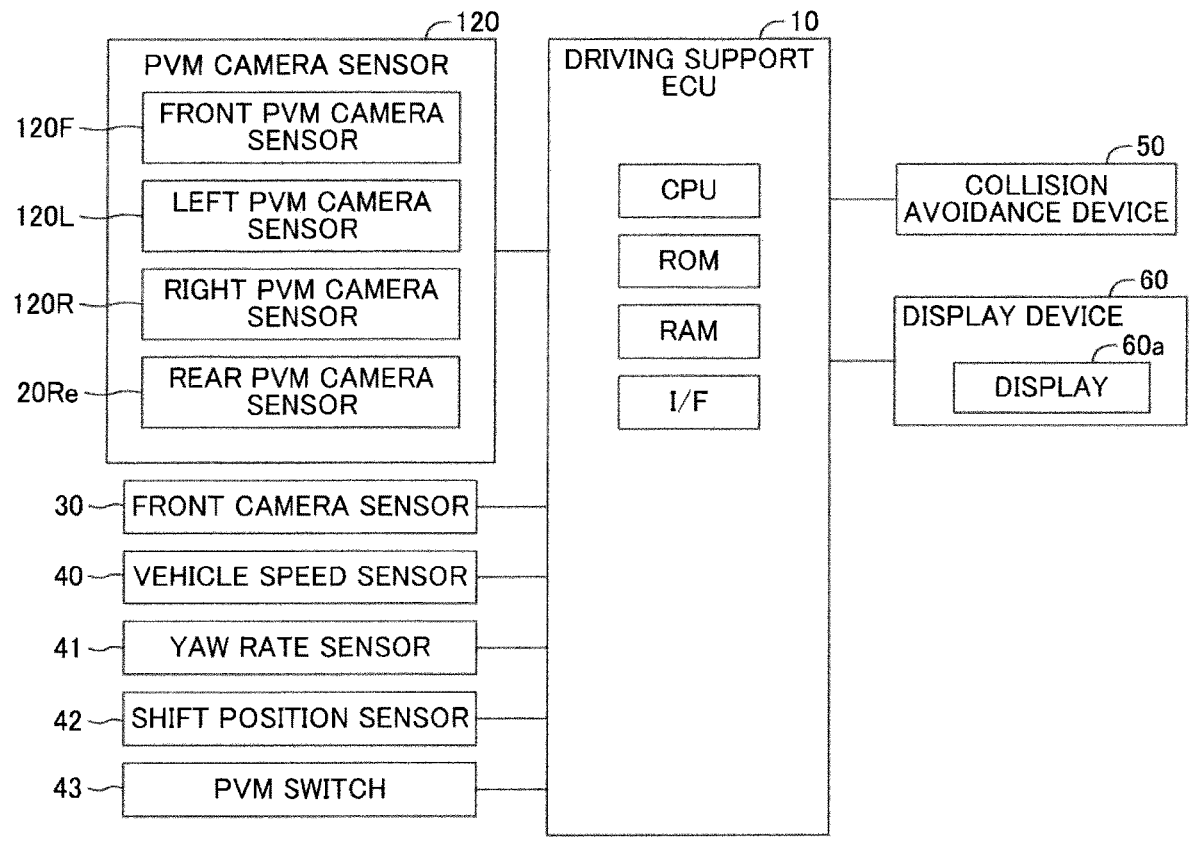
FIG. 9 is a schematic configuration diagram of a driving support apparatus including a left PVM camera sensor and a right PVM camera sensor according to a second embodiment of the present invention.

As illustrated in FIG. 9, the driving support apparatus of the second embodiment is different from the driving support apparatus of the first embodiment in that the driving support apparatus includes a PVM camera sensor 120 in place of the PVM camera sensor 20. The PVM camera sensor 120 includes a front PVM camera sensor 120F, a left PVM camera sensor 120L, a right PVM camera sensor 120R, and the rear PVM camera sensor 20Re.

The camera sensor 120F has substantially the same configuration as those of the camera sensors 20L, 20R, and 20Re in the first embodiment, but is different from the camera sensor 20F in the first embodiment in the following two points.

A fisheye lens (not shown) of the camera sensor 120F has not a free-form surface but a rotationally symmetric curved surface.

The number of pixels of the camera sensor 120F is about 1.2 M (1,280×960) [pix].

A focal length of the fisheye lens and dimensions of an image pickup surface of the camera sensor 120F are designed in advance so that the horizontal angle of view of the camera sensor 120F is 180 degrees and the vertical angle of view thereof is 135 degrees. In this manner, the camera sensor 120F can pick up images of objects positioned in regions on the front side, the diagonally front side, and the lateral side of the front-end center portion of the own vehicle. The camera sensor 120F corresponds to an example of a "front image pickup device."

Figure 10:
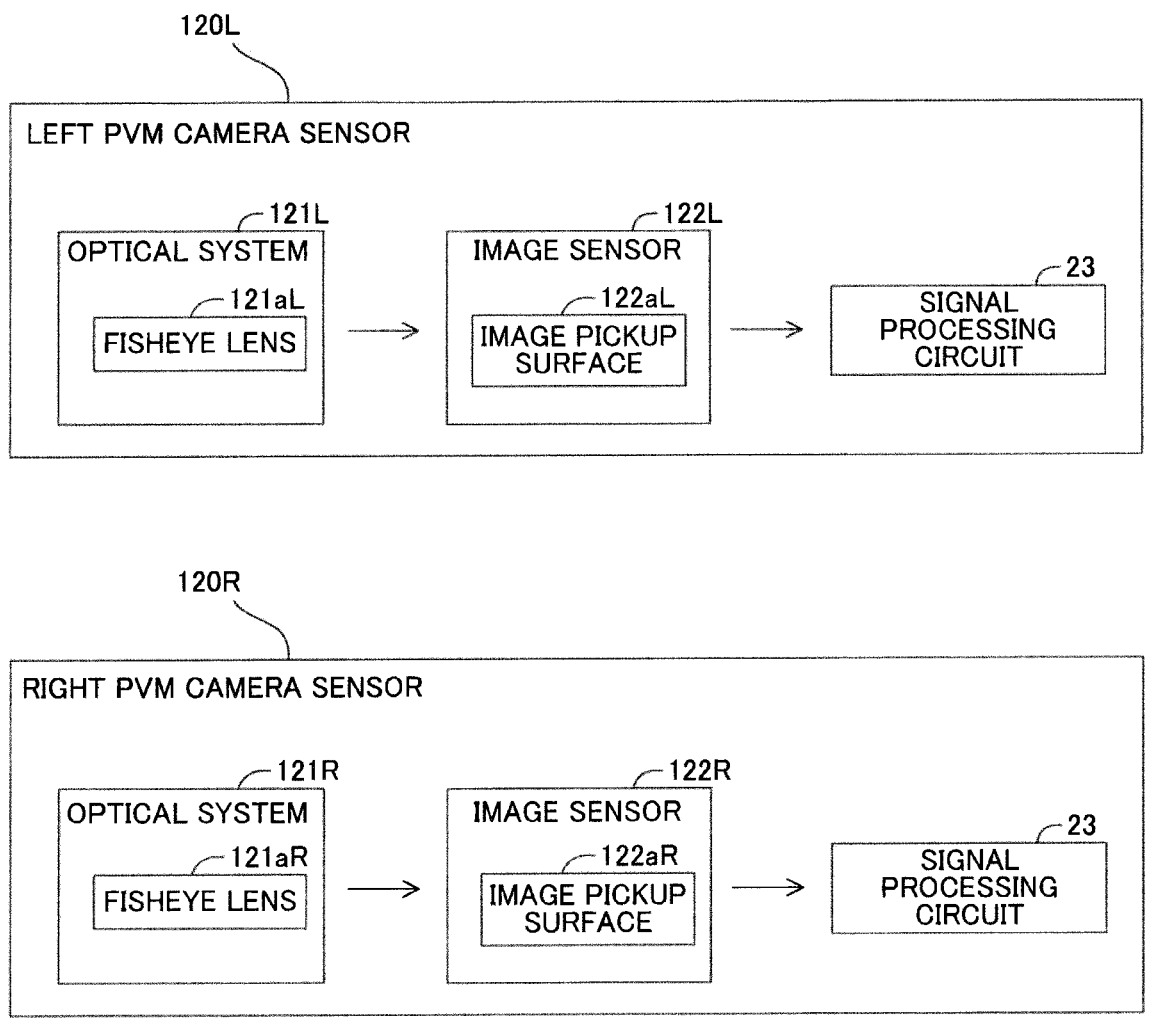
FIG. 10 is a schematic configuration diagram of the left and right PVM camera sensors.

As illustrated in FIG. 10, the camera sensor 120L includes an optical system 121L, an image sensor 122L, and the signal processing circuit 23.

The optical system 121L includes a fisheye lens 121aL. The fisheye lens 121aL is a lens adopting an equidistant projection method, and has a non-rotationally symmetric free-form surface. The detailed configuration of the fisheye lens 121aL is to be described later.

The image sensor 122L has an image pickup surface 122aL in which a plurality of pixels are arrayed at equal intervals in a horizontal direction and a vertical direction (that is, two-dimensionally). Dimensions of the image pickup surface 122aL are the same as the dimensions of the image pickup surface 22a in the first embodiment. That is, the number of pixels of the image sensor 122L is about 2.8 M (1,920×1,440) [pix].

A focal length of the fisheye lens 121aL and dimensions of the image pickup surface 122aL are designed in advance so that a horizontal angle of view of the camera sensor 120L is 180 degrees and a vertical angle of view thereof is 135 degrees. In this manner, the camera sensor 120L can pick up images of objects positioned in a left lateral region of the own vehicle. The camera sensor 120L corresponds to an example of a "camera sensor for image generation," and also corresponds to an example of an "image pickup device" mountable to a left lateral part of the vehicle. The horizontal angle of view of the camera sensor 120L corresponds to an example of a "second horizontal angle of view."

The camera sensor 120R includes an optical system 121R, an image sensor 122R, and the signal processing circuit 23.

The optical system 121R includes a fisheye lens 121aR. The fisheye lens 121aR is a lens adopting an equidistant projection method, and has a non-rotationally symmetric free-form surface. The detailed configuration of the fisheye lens 121aR is to be described later.

The image sensor 122R has an image pickup surface 122aR in which a plurality of pixels are arrayed at equal intervals in a horizontal direction and a vertical direction (that is, two-dimensionally). Dimensions of the image pickup surface 122aR are the same as the dimensions of the image pickup surface 22a in the first embodiment. That is, the number of pixels of the image sensor 122R is about 2.8 M (1,920×1,440) [pix].

A focal length of the fisheye lens 121aR and dimensions of the image pickup surface 122aR are designed in advance so that a horizontal angle of view of the camera sensor 120R is 180 degrees and a vertical angle of view thereof is 135 degrees. In this manner, the camera sensor 120R can pick up images of objects positioned in a right lateral region of the own vehicle. The camera sensor 120R corresponds to an example of a "camera sensor for image generation," and also corresponds to an example of an "image pickup device" mountable to a right lateral part of the vehicle. The horizontal angle of view of the camera sensor 120R corresponds to an example of a "second horizontal angle of view." The camera sensor 30 and the camera sensors 120L and 120R form the image pickup system.

Description is continuously given referring back to FIG. 9. The ECU 10 is configured to acquire, from the camera sensors 120F, 120L, 120R, and 20Re and the camera sensor 30, the "front wide-area image data," the "left wide-area image data," the "right wide-area image data," the "rear wide-area image data," and the "front narrow-area image data", respectively, and to perform processing similar to the processing (1) and the processing (2) in the first embodiment, based on the acquired image data. However, the processing (2) is different from that in the first embodiment in image data to be used when the three-dimensional object is detected. In the following, this difference is specifically described. The "left wide-area image data" and the "right wide-area image data" correspond to examples of "surrounding wide-area image data."

The ECU 10 analyzes, in place of the front wide-area image data, the left wide-area image data and the right wide-area image data together with the front narrow-area image data, and calculates presence or absence of a three-dimensional object and a relative relationship between the own vehicle and the three-dimensional object. In other words, the ECU 10 detects each of the three-dimensional objects present in the image pickup range of the camera sensor 120L, the image pickup range of the camera sensor 120R, and the image pickup range of the camera sensor 30 (see the range RFn of FIG. 6).

Figure 11:
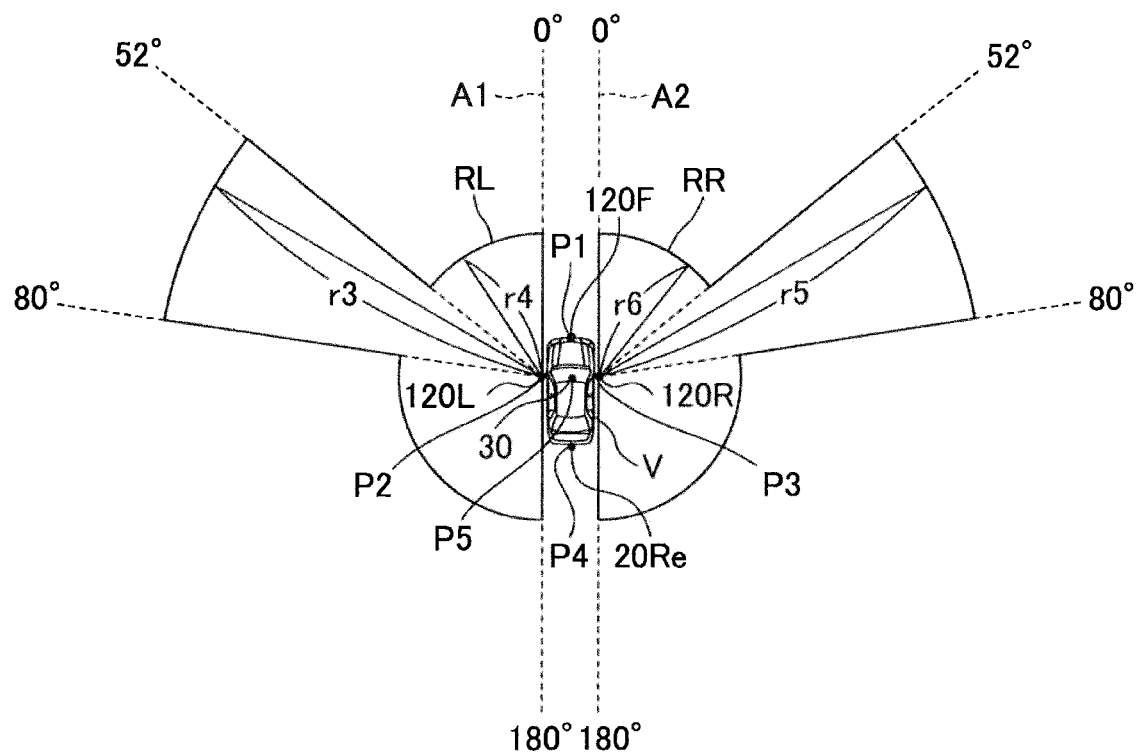
FIG. 11 is a plan view of image pickup ranges of the left and right PVM camera sensors.

A range RL and a range RR of FIG. 11 are plan views of image pickup ranges of the camera sensors 120L and 120R, respectively (that is, ranges in which the ECU 10 can detect the three-dimensional object based on the left wide-area image data and the right wide-area image data). As illustrated in FIG. 11, regarding the camera sensor 120L, the reference orientation is set to an orientation of a reference axis A1 that is an axis passing through the position P2 and being parallel to the longitudinal axis of the own vehicle V. The reference axis A1 is orthogonal to an optical axis (not shown) of the optical system 121L of the camera sensor 120L. In the following, in the horizontal angle of view, an azimuth angle θl on the left side of the reference axis A1 is defined to have a positive value, and an azimuth angle θl on the right side of the reference axis A1 is defined to have a negative value. In addition, in the vertical angle of view, an angle above the optical axis is defined to have a positive value, and an angle below the optical axis is defined to have a negative value. The optical axis of the camera sensor 120L is tilted downward by about 60 degrees with respect to the lateral axis, and the vertical angle of view is 135 degrees. Accordingly, the reference axis A1 is included in the vertical angle of view.

Meanwhile, regarding the camera sensor 120R, the reference orientation is set to an orientation of a reference axis A2 that is an axis passing through the position P3 and being parallel to the longitudinal axis of the own vehicle V. The reference axis A2 is orthogonal to the optical axis (not shown) of the optical system 121R of the camera sensor 120R. In the following, in the horizontal angle of view, an azimuth angle θr on the right side of the reference axis A2 is defined to have a positive value, and an azimuth angle θr on the left side of the reference axis A2 is defined to have a negative value. In addition, in the vertical angle of view, an angle above the optical axis is defined to have a positive value, and an angle below the optical axis is defined to have a negative value. The optical axis of the camera sensor 120R is tilted downward by about 60 degrees with respect to the lateral axis, and the vertical angle of view is 135 degrees. Accordingly, the reference axis A2 is included in the vertical angle of view.

The range RL has a fan shape with a radius r3 in a third range corresponding to an azimuth angle range of 52°≤θl≤80°, and has a fan shape with a radius r4 in a fourth range of the horizontal angle of view excluding the third range (that is, 0°≤θl<52°, 80°<θl≤180°).

The range RR has a fan shape with a radius r5 (=r3) in a fifth range corresponding to an azimuth angle range of 52°≤θl≤80°, and has a fan shape with a radius r6 (=r4) in a sixth range of the horizontal angle of view excluding the fifth range (that is, 0°≤θr<52°, 80°<θr≤180°).

That is, the range RL and the range RR have a relationship of being line symmetric with respect to the longitudinal axis. With the shapes of the range RL and the range RR, the detection limit distances (r3 and r5) for the three-dimensional object in the third range and the fifth range are longer than the detection limit distances (r4 and r6) for the three-dimensional object in the fourth range and the sixth range. This is caused by the configurations of the fisheye lenses 121aL and 121aR. The third range and the fifth range correspond to examples of the "diagonal lateral azimuth angle range," and the fourth range and the sixth range correspond to examples of the "residual azimuth angle range."

Figure 12A:
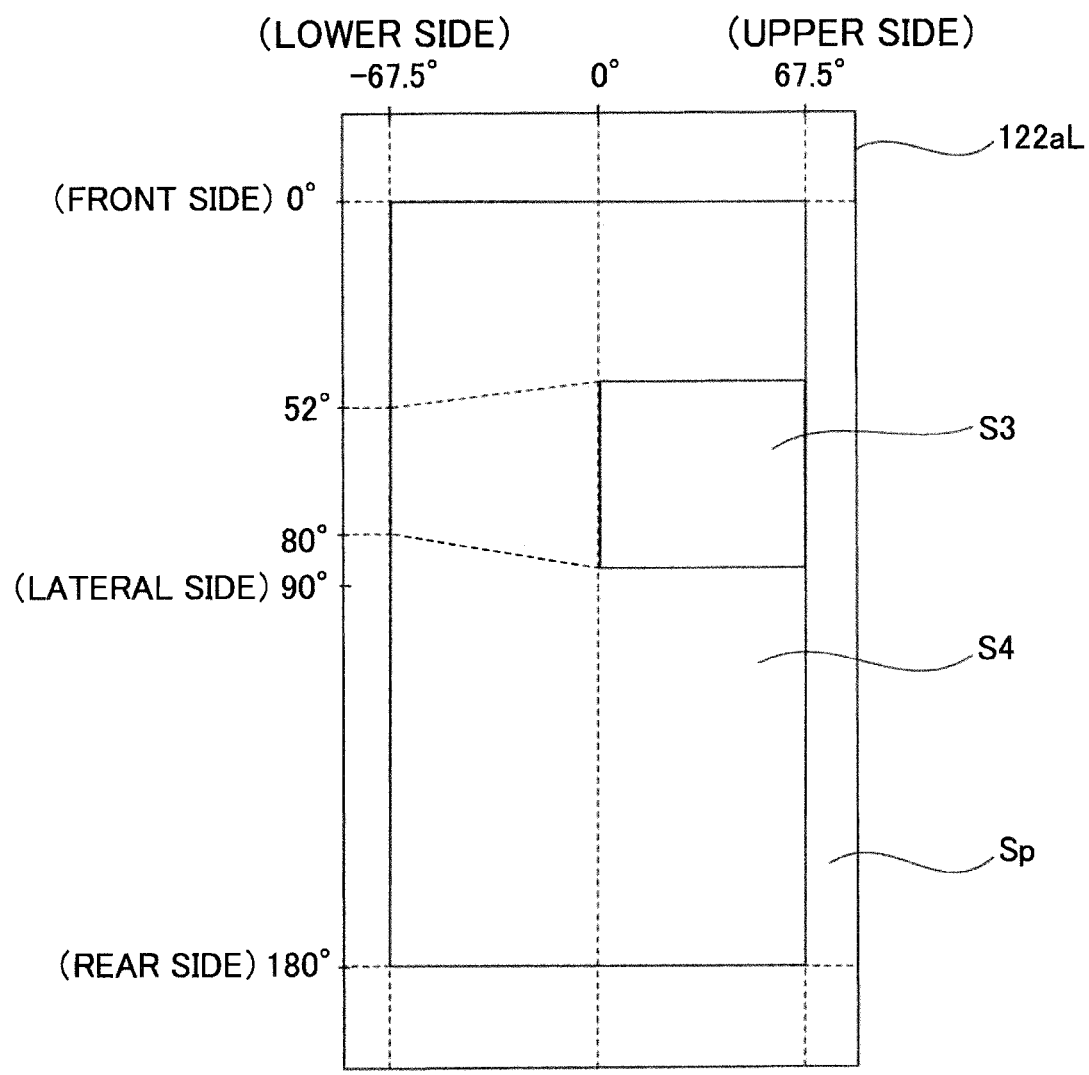
FIG. 12A is a view for illustrating that, in the image pickup surface, third light is imaged so as to be more expanded in the horizontal direction as compared to fourth light.
Figure 12B:
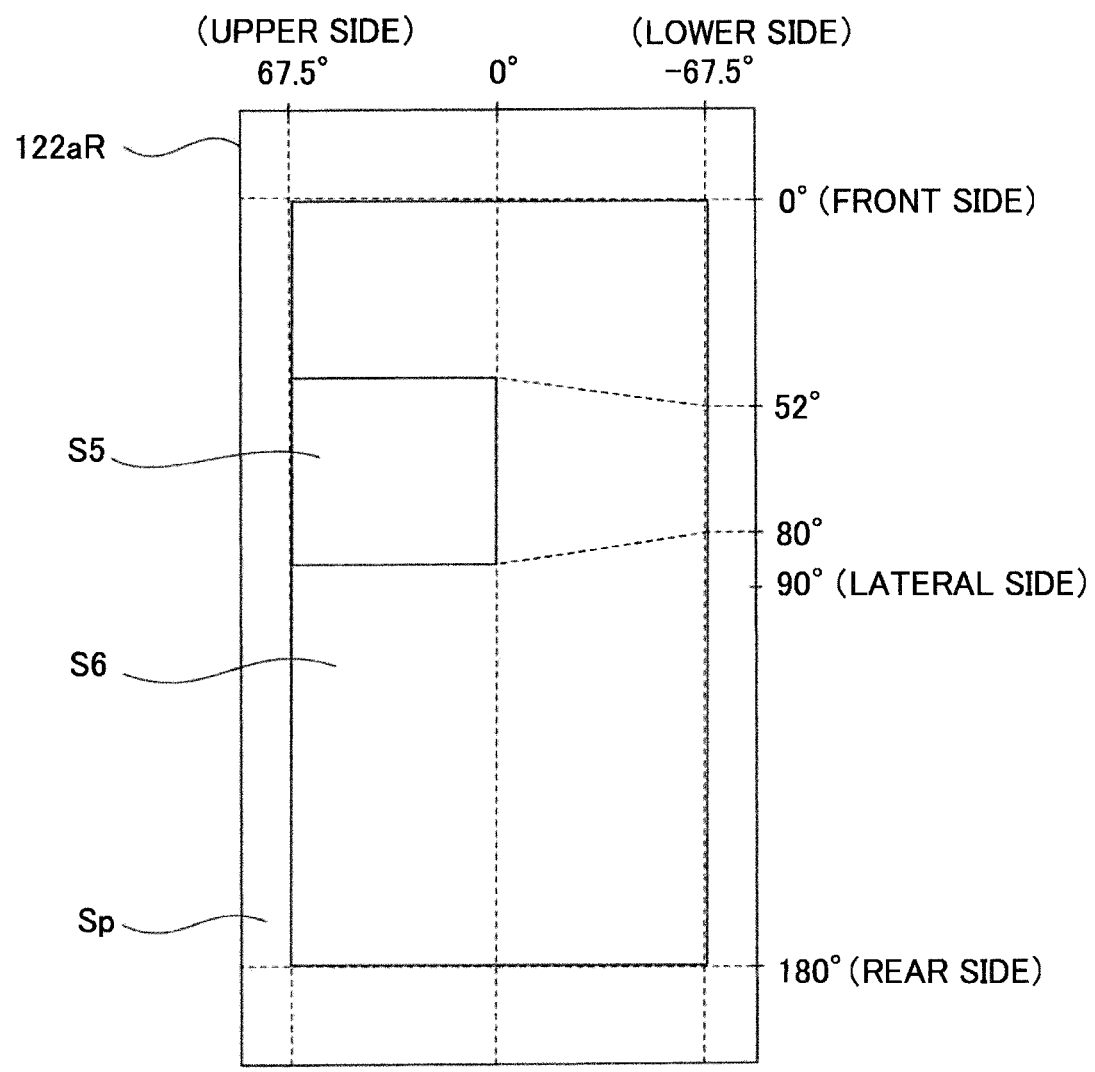
FIG. 12B is a view for illustrating that, in the image pickup surface, fifth light is imaged so as to be more expanded in the horizontal direction as compared to sixth light.

Specific description is given with reference to FIG. 12A and FIG. 12B. As illustrated in FIG. 12A, the image pickup surface 122aL of the camera sensor 120L includes a region S3 and a region S4. The region S3 is a region in which third light being light from an "object present in the third range and also in a second specific vertical range (described later)" is to be imaged onto the image pickup surface 122aL. The region S4 is a region in which fourth light being light from an "object present in the remaining angle range of the horizontal angle of view and the vertical angle of view" is to be imaged onto the image pickup surface 122aL.

As illustrated in FIG. 12B, the image pickup surface 122aR of the camera sensor 120R includes a region S5 and a region S6. The region S5 is a region in which fifth light being light from an "object present in the fifth range and also in a second specific vertical range" is to be imaged onto the image pickup surface 122aR. The region S6 is a region in which sixth light being light from an "object present in the remaining angle range of the horizontal angle of view and the vertical angle of view" is to be imaged onto the image pickup surface 122aR.

The second specific vertical range may be set as a range including the reference axis A1 or A2 and also including the upper side of the vertical angle of view. In the second embodiment, the second specific vertical range is from 0 degrees or more to 67.5 degrees or less. The optical systems 121L and 121R are each configured to image light from an object also onto the surrounding region Sp (region of the image pickup surface 122aL on the outer side of the region S4, and region of the image pickup surface 122aR on the outer side of the region S6). However, electrical signals of pixels forming the surrounding region Sp are not used for generation of the image data.

As illustrated in FIG. 12A, the fisheye lens 121aL is configured to image, when light from an object is to be imaged onto the image pickup surface 122aL via the optical system 121L, the third light onto the image pickup surface 122aL so as to be more expanded in the horizontal direction (up-down direction of the drawing sheet) as compared to the fourth light. The expansion rate is constant over the second specific vertical range. The third light is not expanded in the vertical direction (right-left direction of the drawing sheet). The region S3 corresponds to an example of the "specific region" or the "third region," and the region S4 corresponds to an example of the "residual region" or the "fourth region."

As illustrated in FIG. 12B, the fisheye lens 121aR is configured to image, when light from an object is to be imaged onto the image pickup surface 122aR via the optical system 121R, the fifth light onto the image pickup surface 122aR so as to be more expanded in the horizontal direction as compared to the sixth light. The expansion rate is constant over the second specific vertical range. The fifth light is not expanded in the vertical direction. The region S5 corresponds to an example of the "specific region" or the "fifth region," and the region S6 corresponds to an example of the "residual region" or the "sixth region."

In the second embodiment, the expansion rate of the third light and the expansion rate of the fifth light are equal to each other. Accordingly, the region S3 and the region S5 have rectangular shapes that are congruent to each other. The expansion rate of the third light and the expansion rate of the fifth light may be different from each other.

In other words, the fisheye lens 121aL has a free-form surface processed so that the horizontal pixel density in the region S3 becomes larger than the horizontal pixel density in any region of the region S4. The fisheye lens 121aR has a free-form surface processed so that the horizontal pixel density in the region S5 becomes larger than the horizontal pixel density in any region of the region S6. With this configuration, the resolutions in the horizontal direction in the region S3 and the region S5 are higher than the resolutions in the horizontal direction in the region S4 and the region S6, respectively. As a result, the detection limit distances (r3 and r5) for the three-dimensional object in the third range and the fifth range are longer than the detection limit distances (r4 and r6) for the three-dimensional object in the fourth range and the sixth range, respectively. A lower-limit azimuth angle (52 degrees) of the third range and a lower-limit azimuth angle (52 degrees) of the fifth range are determined based on the boundary azimuth angles (50 degrees and −50 degrees) of the front camera sensor 30.

Figure 13:
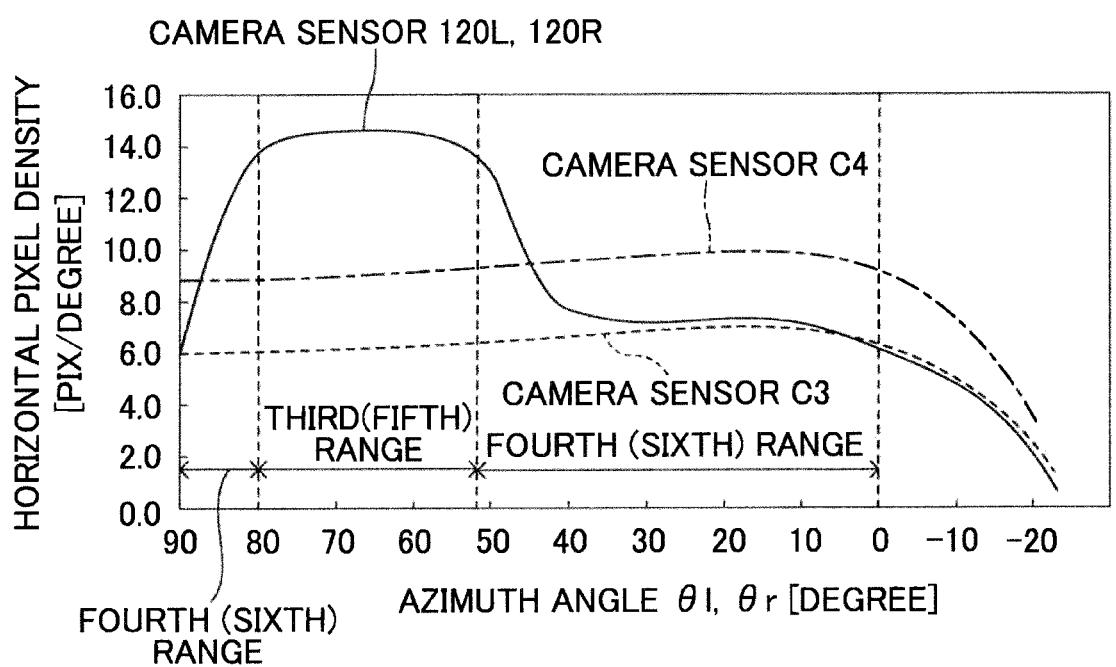
FIG. 13 is a graph for showing a relationship between an azimuth angle and a horizontal pixel density of each of the left and right PVM camera sensors.

A relationship between the detection limit distance for the three-dimensional object and the horizontal pixel density is specifically described with reference to FIG. 13. FIG. 13 is a graph for showing a relationship between the azimuth angle and the horizontal pixel density (strictly speaking, horizontal pixel density at a certain angle (for example, 60 degrees) within the second specific vertical range) of each of the camera sensors 120L and 120R and camera sensors C3 (see the broken line) and C4 (see the long-dashed short-dashed line) being comparative examples. An azimuth angle range larger than 90 degrees is not shown. In the second embodiment, the fisheye lenses 121aL and 121aR are configured so that the horizontal pixel density distribution of the image pickup surface 122aL and the horizontal pixel density distribution of the image pickup surface 122aR become the same as each other. Accordingly, in the graph of FIG. 13, the behavior of the camera sensor 120L and the behavior of the camera sensor 120R match each other.

Lenses included in optical systems of the camera sensors C3 and C4 are both fisheye lenses. However, each of those fisheye lenses is different from the fisheye lens 121aL of the camera sensor 120L and the fisheye lens 121aR of the camera sensor 120R in that the fisheye lens has a rotationally symmetric curved surface.

The number of pixels of the camera sensor C3 is about 1.2 M (1,280×960) [pix], and the horizontal angle of view thereof is 180 degrees. That is, the camera sensor C3 has substantially the same configuration as those of the camera sensors 120F and 20Re.

The number of pixels of the camera sensor C4 is about 2.8 M (1,920×1,440) [pix], and the horizontal angle of view thereof is 180 degrees. That is, the camera sensor C4 has substantially the same configuration as those of the camera sensors 120L and 120R except that the fisheye lens does not have the free-form surface.

As described above, each of the camera sensors 120R and 120L is configured so that the expansion rates in the horizontal direction of the third light and the fifth light are constant over the second specific vertical range. The same holds true also in the camera sensors C3 and C4. Accordingly, the relationship between the azimuth angle and the horizontal pixel density of each of the camera sensors 120L, 120R, C3, and C4 is unchanged over the second specific vertical range.

The optical system included in each of the camera sensors 120L, 120R, C3, and C4 is configured to be capable of imaging also light from an object present in azimuth angle ranges of about −20°<θl and θr<0° onto each image pickup surface. Accordingly, the graph of FIG. 13 also shows the horizontal pixel densities in those azimuth angle ranges. However, electrical signals of pixels corresponding to those azimuth angle ranges in the image pickup surface are not used for generation of the image data.

As shown in FIG. 13, the camera sensors 120L and 120R respectively include, unlike the camera sensors C3 and C4, the fisheye lenses 121aL and 121aR each having the free-form surface processed as described above. Accordingly, the horizontal pixel density of each of the camera sensors 120L and 120R is larger than the horizontal pixel density of the camera sensor C4 (that is, a camera sensor having the same number of pixels as those of the camera sensors 120L and 120R) in the azimuth angle ranges of 45°≤θl and θr≤87°. In particular, in the third range and the fifth range, the horizontal pixel density of each of the camera sensors 120L and 120R is about 1.6 times as large as the horizontal pixel density of the camera sensor C4. In general, within a predetermined azimuth angle range, the detection limit distance for the three-dimensional object and the horizontal pixel density at any angle within the second specific vertical range are substantially proportional to each other. Accordingly, in the third and fifth ranges, the detection limit distances r3 and r5 (see FIG. 11) for the three-dimensional object of the camera sensors 120L and 120R are about 1.6 times (about 43 [m]) of the detection limit distance (about 27 [m]) for the three-dimensional object of the camera sensor C2.

Meanwhile, in the fourth and sixth ranges, the horizontal pixel density of each of the camera sensors 120L and 120R is maintained to be equivalent to or larger than the horizontal pixel density of the camera sensor C3. Accordingly, an image quality of the PVM image is prevented from being degraded due to the fisheye lenses 121aL and 121aR having the free-form surface. In the fourth and sixth ranges, the detection limit distances r4 and r6 (see FIG. 11) for the three-dimensional object of the camera sensors 120L and 120R are substantially equal to the detection limit distance (about 20[m]) for the three-dimensional object of the camera sensor C3.

As described above, the camera sensors 120L and 120R include the fisheye lenses 121aL and 121aR having the above-mentioned free-form surface. Thus, while the image quality of the PVM image is maintained at the same level as that in the related art (in other words, without causing the number of pixels of each of the camera sensors 120L and 120R to be over-performance with respect to the resolution of the display 60a), in a specific range of the horizontal angle of view (in the second embodiment, the third or fifth range), the detection limit distance for the three-dimensional object can be greatly extended as compared to the camera sensor C4 having the same number of pixels as those of the camera sensors 120L and 120R.

Figure 14:
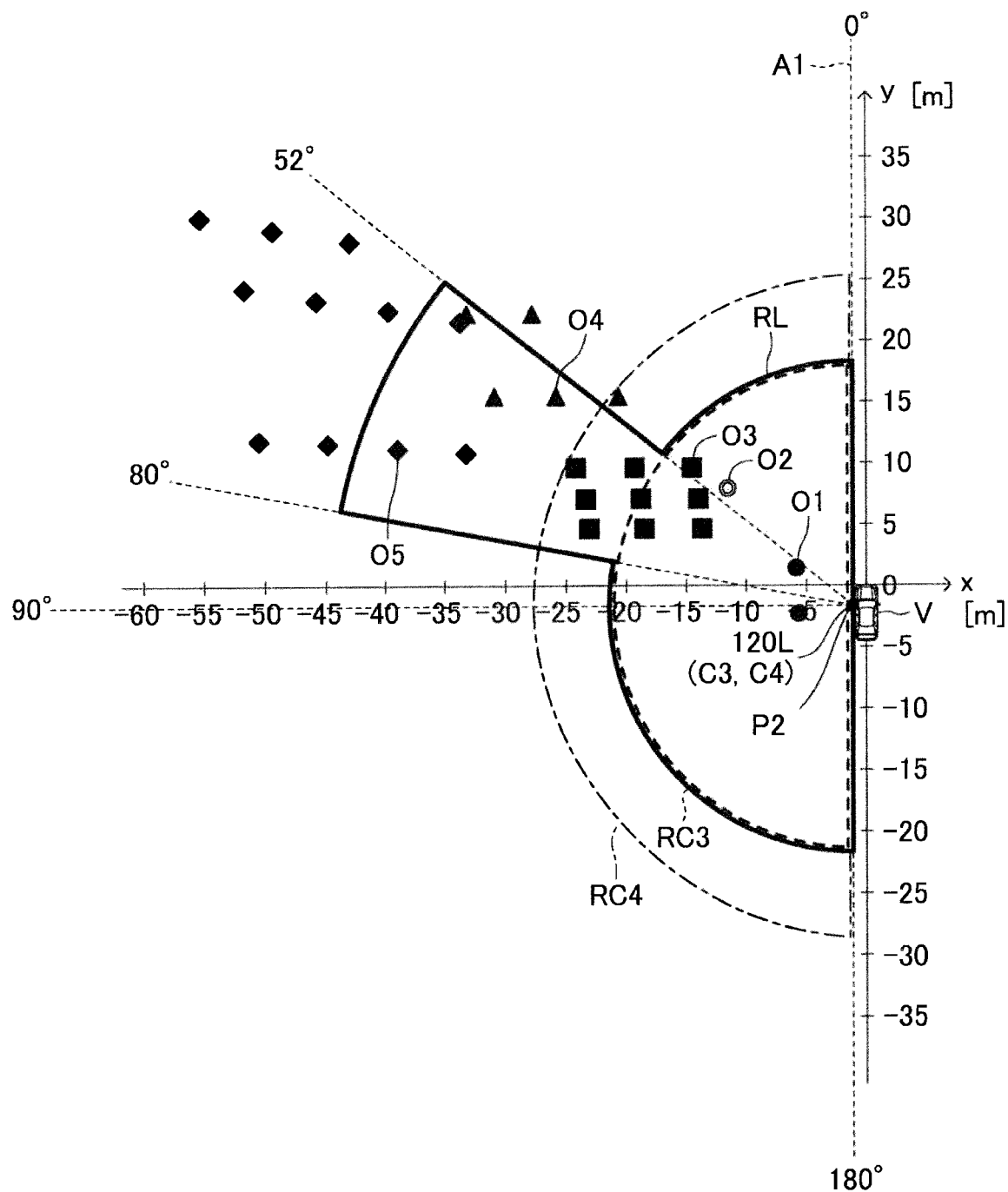
FIG. 14 is a plan view in which the image pickup ranges of the left and right PVM camera sensors and image pickup ranges of two camera sensors being comparative examples are superimposed on FIG. 7.

The camera sensors 120L and 120R including the fisheye lenses 121aL and 121aR as described above are particularly useful when the own vehicle turns right or left at an intersection, or when the own vehicle travels straight through an intersection without traffic lights. Now, specific description is given with reference to FIG. 14 with the camera sensor 120L being given as an example FIG. 14 is a view in which the range RL in an azimuth angle range of 0°≤θl≤180°, a range RC3, and a range RC4 are superimposed on FIG. 7. Here, the range RC3 and the range RC4 are each a plan view of an image pickup range in a case in which each of the camera sensors C3 and C4 (see FIG. 13) is mounted at the position P2 of the own vehicle V. With reference to FIG. 14, a specific azimuth angle range in which the three-dimensional objects O1 to O5 are distributed matches the third range. Although not shown in FIG. 14, almost all of various types of three-dimensional objects with which, when the own vehicle V turns right at an intersection or when the own vehicle V travels straight through an intersection without traffic lights at various vehicle speeds, the own vehicle V is to collide after an elapse of three seconds are distributed in a biased manner in a specific azimuth angle range of the own vehicle V similarly to the three-dimensional objects O1 to O5, and this specific azimuth angle range is considered to match the sixth range of the camera sensor 120R.

With the camera sensors 120L and 120R, effects similar to those of the camera sensor 20F in the first embodiment can be obtained.

In the above, the image pickup system and the image pickup device according to the embodiments have been described, but the present invention is not limited to the above-mentioned embodiments, and various changes are possible within the range not departing from the object of the present invention.

For example, any of the horizontal angle of view of the camera sensor 20F in the first embodiment, and the horizontal angles of view of the camera sensors 120L and 120R in the second embodiment may be more than 180 degrees (for example, 190 degrees).

In addition, in the first embodiment, the left first range is only required to be any azimuth angle range satisfying 45°<θf<90°, and the right first range is only required to be any azimuth angle range satisfying −90°<θf<−45°. Similarly, in the second embodiment, the third range and the fourth range are each only required to be any azimuth angle range satisfying 45°<θl, θr<90°.

Further, in the first embodiment, the camera sensor 20F is not required to be used for generation of the PVM image.

That is, the camera sensor 20F is not required to also have the function of the front PVM camera sensor, and may be newly introduced in addition to the front PVM camera sensor. The same holds true also in the second embodiment.

Further, in the second embodiment, the camera sensors 120L and 120R are not required to be mounted as a pair on the own vehicle V, and any one of the camera sensors 120L and 120R may be mounted alone. When the camera sensor 120L is mounted at the position P2 of the own vehicle V, the camera sensor 20R (that is, the related-art right PVM camera sensor) may be mounted at the position P3. Similarly, when the camera sensor 120R is mounted at the position P3 of the own vehicle V, the camera sensor 20L (that is, the related-art left PVM camera sensor) may be mounted at the position P2. Also with this configuration, an image of a three-dimensional object present on the diagonally forward left or the diagonally forward right of the own vehicle V can be appropriately picked up.

What is claimed is:

1. An image pickup system for a vehicle, the image pickup system comprising:
    a front camera sensor having a predetermined first horizontal angle of view in which a horizontal angle of view is less than 180 degrees when an orientation of a reference axis that is an axis parallel to a longitudinal axis of a vehicle is set as a reference orientation, the front camera sensor being configured to be mounted to the vehicle so that the first horizontal angle of view is included in a region on a front side of the vehicle with respect to azimuth angles corresponding to a lateral direction of the vehicle, the front camera sensor further being configured to perform photoelectric conversion on light from, among objects positioned in front of the vehicle, an object positioned within the first horizontal angle of view into an electrical signal, to thereby acquire front narrow-area image data to be used for driving support control of the vehicle; and
    a camera sensor for image generation having a predetermined second horizontal angle of view in which the horizontal angle of view is 180 degrees or more, the camera sensor for image generation being configured to be mounted to the vehicle, and further being configured to perform photoelectric conversion on light from, among objects positioned around the vehicle, an object positioned within the second horizontal angle of view into an electrical signal, to thereby acquire surrounding wide-area image data to be used for generating an overhead view image of the vehicle,
    wherein the camera sensor for image generation includes:
        an image sensor having an image pickup surface in which a plurality of pixels each configured to perform the photoelectric conversion are two-dimensionally arrayed; and
        an optical system, which includes a lens, and is configured to image the light from the objects onto the image pickup surface, wherein the image sensor has:
        a specific region in which light from an object positioned within a diagonal lateral azimuth angle range is to be imaged onto the image pickup surface, the diagonal lateral azimuth angle range being a range from a predetermined azimuth angle to an azimuth angle corresponding to a diagonally forward direction of the vehicle, the predetermined azimuth angle being determined based on a boundary azimuth angle being an azimuth angle at a boundary line defining the first horizontal angle of view; and
        a residual region in which light from an object positioned within a residual azimuth angle range is to be imaged onto the image pickup surface, the residual azimuth angle range being obtained by excluding the diagonal lateral azimuth angle range from the second horizontal angle of view,
    wherein the lens is a lens having a curved surface formed so that a horizontal pixel density in the specific region becomes larger than the horizontal pixel density in the residual region while a vertical pixel density in the specific region is equal to the vertical pixel density in the residual region, the horizontal pixel density being the number of pixels per unit horizontal angle of view and the vertical pixel density being the number of pixels per unit vertical angle of view, and
    wherein the surrounding wide-area image data acquired by the camera sensor for image generation is formed to be usable for the driving support control of the vehicle.

2. The image pickup system according to claim 1, wherein the lens is a fisheye lens.

3. The image pickup system according to claim 1, wherein the front camera sensor includes at least one fisheye lens with a rotationally symmetric curved surface.

4. An image pickup device which is mountable to a front part of a vehicle, the image pickup device comprising:
    an image sensor having an image pickup surface in which a plurality of pixels are two-dimensionally arrayed, the plurality of pixels each being configured to perform photoelectric conversion on received light into an electrical signal and output the electrical signal; and
    an optical system, which includes a lens, and is configured to image light from an object onto the image pickup surface,
    wherein dimensions of the image pickup surface and a focal length of the lens are set so that a horizontal angle of view is 180 degrees or more,
    wherein, when an orientation of a reference axis that is an axis passing through a mounting position to the vehicle and being parallel to a longitudinal axis of the vehicle is set as a reference orientation, in a case in which, in the horizontal angle of view, an azimuth angle on a left side of the reference axis is defined to have a positive value, and an azimuth angle on a right side of the reference axis is defined to have a negative value:
        the reference axis is included in a vertical angle of view; and
        the image pickup surface has:
            a first region which is a region corresponding to a left first range and a right first range, the left first range being included in an azimuth angle range that is larger than 45 degrees and smaller than 90 degrees, the right first range being included in an azimuth angle range that is larger than −90 degrees and smaller than −45 degrees; and
            a second region which is a region corresponding to a second range being an azimuth angle range of the horizontal angle of view excluding the left first range and the right first range, and
    wherein the lens has a curved surface formed so that a horizontal pixel density in the first region becomes larger than the horizontal pixel density in the second region while a vertical pixel density in the first region is equal to the vertical pixel density in the second region, the horizontal pixel density being the number of pixels per unit horizontal angle of view and the vertical pixel density being the number of pixels per unit vertical angle of view.

5. The image pickup device according to claim 4 is configured to acquire surrounding wide-area image data to be used for generating an overhead view image of the vehicle.

6. The image pickup device according to claim 4 wherein the lens is a fisheye lens.

7. The image pickup device according to claim 6, wherein the lens has a rotationally symmetric curved surface.

8. The image pickup device according to claim 7, wherein the wherein dimensions of the image pickup surface and a focal length of the lens are set so that a vertical angle of view is 135 degrees.

9. An image pickup device which is mountable to a left lateral part of a vehicle, the image pickup device comprising:
   an image sensor having an image pickup surface in which a plurality of pixels are two-dimensionally arrayed, the plurality of pixels each being configured to perform photoelectric conversion on received light into an electrical signal and output the electrical signal; and
   an optical system, which includes a lens, and is configured to image light from an object onto the image pickup surface,
   wherein dimensions of the image pickup surface and a focal length of the lens are set so that a horizontal angle of view is 180 degrees or more,
   wherein, when an orientation of a reference axis that is an axis passing through a mounting position to the vehicle and being parallel to a longitudinal axis of the vehicle is set as a reference orientation, in a case in which, in the horizontal angle of view, an azimuth angle on a left side of the reference axis is defined to have a positive value, and an azimuth angle on a right side of the reference axis is defined to have a negative value:
      the reference axis is included in a vertical angle of view; and
      the image pickup surface has:
         a third region which is a region corresponding to a third range and a fourth region which is a region corresponding to a fourth range, the third range being included in an azimuth angle range that is larger than 45 degrees and smaller than 90 degrees, the fourth range being an azimuth angle range of the horizontal angle of view excluding the third range, and
   wherein the lens has a curved surface formed so that a horizontal pixel density in the third region becomes larger than the horizontal pixel density in the fourth region while a vertical pixel density in the third region is equal to the vertical pixel density in the fourth region, the horizontal pixel density being the number of pixels per unit horizontal angle of view and the vertical pixel density being the number of pixels per unit vertical angle of view.

10. The image pickup device according to claim 9 is configured to acquire surrounding wide-area image data to be used for generating an overhead view image of the vehicle.

11. The image pickup device according to claim 9, wherein the lens is a fisheye lens.

12. The image pickup device according to claim 11, wherein the lens has a non-rotationally symmetric free-form surface.

13. An image pickup device which is mountable to a right lateral part of a vehicle, the image pickup device comprising:
   an image sensor having an image pickup surface in which a plurality of pixels are two-dimensionally arrayed, the plurality of pixels each being configured to perform photoelectric conversion on received light into an electrical signal and output the electrical signal; and
   an optical system, which includes a lens, and is configured to image light from an object onto the image pickup surface,
   wherein dimensions of the image pickup surface and a focal length of the lens are set so that a horizontal angle of view is 180 degrees or more,
   wherein, when an orientation of a reference axis that is an axis passing through a mounting position to the vehicle and being parallel to a longitudinal axis of the vehicle is set as a reference orientation, in a case in which, in the horizontal angle of view, an azimuth angle on a right side of the reference axis is defined to have a positive value, and an azimuth angle on a left side of the reference axis is defined to have a negative value:
      the reference axis is included in a vertical angle of view; and
      the image pickup surface has:
         a fifth region which is a region corresponding to a fifth range and a sixth region which is a region corresponding to a sixth range, the fifth range being included in an azimuth angle range that is larger than 45 degrees and smaller than 90 degrees, the sixth range being an azimuth angle range of the horizontal angle of view excluding the fifth range, and
   wherein the lens has a curved surface formed so that a horizontal pixel density in the fifth region becomes larger than the horizontal pixel density in the sixth region while a vertical pixel density in the fifth region is equal to the vertical pixel density in the sixth region, the horizontal pixel density being the number of pixels per unit horizontal angle of view and the vertical pixel density being the number of pixels per unit vertical angle of view.

14. The image pickup device according to claim 13 is configured to acquire surrounding wide-area image data to be used for generating an overhead view image of the vehicle.

15. The image pickup device according to claim 13, wherein the lens is a fisheye lens.

16. The image pickup device according to claim 15, wherein the lens has a non- rotationally symmetric.

* * * * *